(12) United States Patent
Nakamura et al.

(10) Patent No.: US 8,499,870 B2
(45) Date of Patent: Aug. 6, 2013

(54) WORK VEHICLE WITH ENGINE, AIR CLEANER, AND BATTERY

(75) Inventors: Taro Nakamura, Sakai (JP); Ryouzou Imanishi, Kishiwada (JP); Yoshimi Hirooka, Sakai (JP); Norimi Nakamura, Sakai (JP); Tatsuya Nose, Sakai (JP); Kazuyoshi Kawamoto, Osaka (JP)

(73) Assignee: Kubota Corporation, Osaka (JP)

( * ) Notice: Subject to any disclaimer, the term of this patent is extended or adjusted under 35 U.S.C. 154(b) by 272 days.

(21) Appl. No.: 12/873,764

(22) Filed: Sep. 1, 2010

(65) Prior Publication Data

US 2011/0132678 A1 Jun. 9, 2011

(30) Foreign Application Priority Data

Dec. 7, 2009 (JP) ................................. 2009-277961

(51) Int. Cl.
*B60K 13/02* (2006.01)
*B60R 7/04* (2006.01)
(52) U.S. Cl.
USPC ....................................... 180/68.3; 296/37.15
(58) Field of Classification Search
USPC .................. 180/68.1, 68.2, 68.3; 296/37.15, 296/65.05; 297/188.1; 298/1 A, 17 R
See application file for complete search history.

(56) References Cited

U.S. PATENT DOCUMENTS

| | | | | |
|---|---|---|---|---|
| 4,800,980 A | * | 1/1989 | Hideo et al. ................... | 180/225 |
| 4,930,591 A | * | 6/1990 | Lanius et al. ................. | 180/65.1 |
| 5,556,441 A | * | 9/1996 | Courtwright et al. ............ | 55/502 |
| 5,561,359 A | * | 10/1996 | Matsuura et al. ............. | 180/68.2 |
| 5,570,751 A | * | 11/1996 | Courtwright et al. ......... | 180/68.3 |
| 5,671,820 A | * | 9/1997 | Kobayashi et al. ........... | 180/68.1 |
| 7,673,920 B2 | * | 3/2010 | Nakamura et al. ......... | 296/37.15 |
| 7,735,889 B2 | * | 6/2010 | Yamamura et al. ......... | 296/24.43 |
| 7,735,896 B2 | * | 6/2010 | Kubota ........................... | 296/69 |
| 7,775,311 B1 | * | 8/2010 | Hardy et al. ................. | 180/68.5 |
| 2008/0084082 A1 | * | 4/2008 | Nakamura et al. ......... | 296/37.15 |
| 2010/0019539 A1 | | 1/2010 | Nakamura et al. | |

FOREIGN PATENT DOCUMENTS

JP 2005178782 A 7/2005

* cited by examiner

*Primary Examiner* — J. Allen Shriver, II
*Assistant Examiner* — James M Dolak
(74) *Attorney, Agent, or Firm* — The Webb Law Firm

(57) ABSTRACT

A work vehicle includes: a seat disposed between front wheels and rear wheels; an engine disposed between the right and left rear wheels rearward of the seat; a battery disposed in a container space positioned downward of the seat disposed frontward of the rear wheels; an air cleaner disposed in the container space and arranged proximally to the battery in a vehicle longitudinal direction; and an opening-closing lid unit for covering the air cleaner and the battery from outside in a vehicle transverse direction. An element of the air cleaner is disposed in the air cleaner so that the element is insertable and removable in the vehicle transverse direction, and a position of the air cleaner is set so that the element is accessible from outside the vehicle body.

10 Claims, 18 Drawing Sheets

WORK VEHICLE WITH ENGINE, AIR CLEANER, AND BATTERY

BACKGROUND OF THE INVENTION

1. Field of the Invention

The present invention relates to a work vehicle including: a seat disposed between front wheels and rear wheels; an engine disposed between the right rear wheel and the left rear wheel rearward of the seat; an air cleaner; and a battery.

2. Description of the Related Art

When a motor part is disposed between the right rear wheel and the left rear wheel rearward of the seat positioned between the front wheels and the rear wheels, there is no need to provide a space for disposing the motor part frontward of the seat, and thus a large space for a drive part is advantageously secured frontward of the seat in a vehicle body.

Prior art techniques that have adopted such a structure include, for example, Japanese Unexamined Patent Application Publication No. 2005-178782 (see paragraph [0017] and FIGS. 9 and 10), and United States Unexamined Patent Application Publication No. 2010/0019539. Japanese Unexamined Patent Application Publication No. 2005-478782 describes a work vehicle having a body frame includes: a rear frame positioned on a rear side at a height level higher than that of a floor face of a drive part; and a front frame disposed frontward of the rear frame so as to support the floor face of the drive part. An engine and a transmission case are supported by a support frame below the rear frame of the body frame, and an air cleaner is exposed on a lateral outer side of the vehicle body, in a lateral side portion frontward of the engine and the transmission case.

In the conventional work vehicle described above, the air cleaner is disposed laterally outside of a motor part which is positioned at a low height level from the ground. In order to prevent sand, dust and mud water on a running road or the like from entering an ambient air intake opening of the air cleaner, the ambient air intake opening is positioned at a high height level from the ground, in an upper portion of a lateral outer cover positioned laterally outward of a driver's seat. In other words, though the air cleaner itself is positioned at a low height level laterally outside of the motor part, the ambient air intake opening of the air cleaner is positioned at a high height level so as to face an intake hole disposed in an upper portion of the lateral outer cover, and ambient air is introduced to the air cleaner through an intake duct.

This configuration has an advantage that clean ambient air can be introduced from a high height level while the air cleaner is disposed at a low height level near the engine utilizing an empty space in the motor part. However, a number of parts, such as parts of the intake duct, will be increased in order to position the ambient air intake opening at a high height level. In addition, a number of steps, including removal and attachment of the intake duct, in addition to the removal of air cleaner, will be increased upon exchanging an element.

Moreover, like the air cleaner, the installed battery device is required to be protected from dust and mud water, and thus is generally disposed in a space formed below the seat or below the truck box positioned in the rear portion. In this case, every time the maintenance and inspection of the battery is performed, the operation of opening the seat, or the operation of dumping of the truck box should be performed, increasing the operation step number during maintenance and inspection.

SUMMARY OF THE INVENTION

Accordingly, it is desirable to provide a work vehicle having a seat disposed between the front wheels and the rear wheels, and an engine disposed between the right rear wheel and the left rear wheel rearward of the seat, wherein an air cleaner and a battery is shielded from outside with a simple structure while facilitating maintenance and inspection thereof.

The work vehicle according to the present invention includes a pair of steerable right and left front wheels provided in a front portion of a vehicle body; a pair of nonsteerable right and left rear wheels provided in a rear portion of the vehicle body; a seat disposed between the front wheels and the rear wheels; an engine disposed between the right and left rear wheels rearward of the seat; a battery disposed in a container space positioned downward of the seat disposed frontward of the rear wheels; an air cleaner which is disposed in the container space and arranged proximally to the battery in a vehicle longitudinal direction; and an opening-closing lid unit configured to cover the air cleaner and the battery from outside in a vehicle transverse direction. A filter element of the air cleaner is disposed in the air cleaner so that the filter element is insertable and removable in the vehicle transverse direction, and a position of the air cleaner is set in such a manner that the filter element is accessible from outside the vehicle body.

With this configuration, the air cleaner and the battery are disposed at a low height level near the engine between the right rear wheel and the left rear wheel rearward of the seat, while an opening-closing lid unit prevents the air cleaner and the battery from being directly exposed to sand, dust and mud water.

In this case, the opening-closing lid unit may include a single opening-closing lid configured to cover both the air cleaner and the battery from outside on one side in the vehicle transverse direction.

In the container space, the battery and the air cleaner are arranged in a longitudinal direction, and the opening-closing lid with which an opening-closing operation can be performed is provided laterally outside of the container space. Therefore, by simply opening the opening-closing lid, the battery and/or the air cleaner can be easily inspected.

In addition, the insertion-removal direction of the filter element of the air cleaner is set in such a manner that the element can be replaced in a transverse direction from outside the vehicle body, the operations, such as opening of the seat, dumping of the truck box, and canceling of the connection of associated parts, become necessary, and an advantage is obtained that the replacement operation of the filter element in the traverse direction from outside the vehicle body can be easily performed.

In one aspect of the present invention, the engine is disposed below a rear frame positioned upward and rearward of a driver floor in the front portion of the vehicle body, the driver floor is supported by a front frame disposed frontward of the rear frame, and the battery and the air cleaner are disposed on an outer side of the front frame and/or the rear frame in the vehicle transverse direction.

With this configuration, the stepped body frame, the seat and the rear wheels define the upper, front and rear boundaries of the container space, and a protective performance from obstacles becomes excellent. Further, since the space is accessible from a lateral side without opening the seat and the like, an operation of maintenance becomes easy.

In another aspect of the present invention, a bottom plate unit defining a lower side of the container space includes a first sub bottom plate positioned at a higher height level and a second sub bottom plate positioned at a lower height level, the sub bottom plates being arranged in the vehicle longitudinal direction, the air cleaner is mounted on the first sub bottom plate, the battery is mounted on the second sub bottom plate, and an intake opening of the air cleaner is directed to an upper side of the battery.

With this configuration, the intake opening of the air cleaner is directed to an upper side of the battery in the container space, and thus gas in the container space heated by heat release from the battery in operation is sucked by the air cleaner, to thereby suppress temperature raise in the small container space. Accordingly, heat is smoothly released from the battery, and thus an adverse thermal effect on the battery due to the temperature raise in the container space can be advantageously moderated.

In addition, when a fuse box is disposed frontward of the intake opening of the air cleaner, a flow of gas to be sucked into the intake opening of the air cleaner passes in the vicinity of the fuse box, and thus removes heat generated by the fuse box. With this configuration, the air cleaner also serves as cooling means for the fuse box, and thus is effective for preventing failures in an electric system caused by unnecessary temperature increase in the fuse box.

DETAILED DESCRIPTION OF THE PREFERRED EMBODIMENTS

<Entire Configuration of Work Vehicle>

One embodiment of the work vehicle according to the present invention will be described with reference to the drawings. The terms "front", "rear", "upper", "lower", "right", "left", "inside", "outside" and other similar expressions relating to directions used herein represent directions as seen from a driver seated in a driver's seat.

Figure 1:
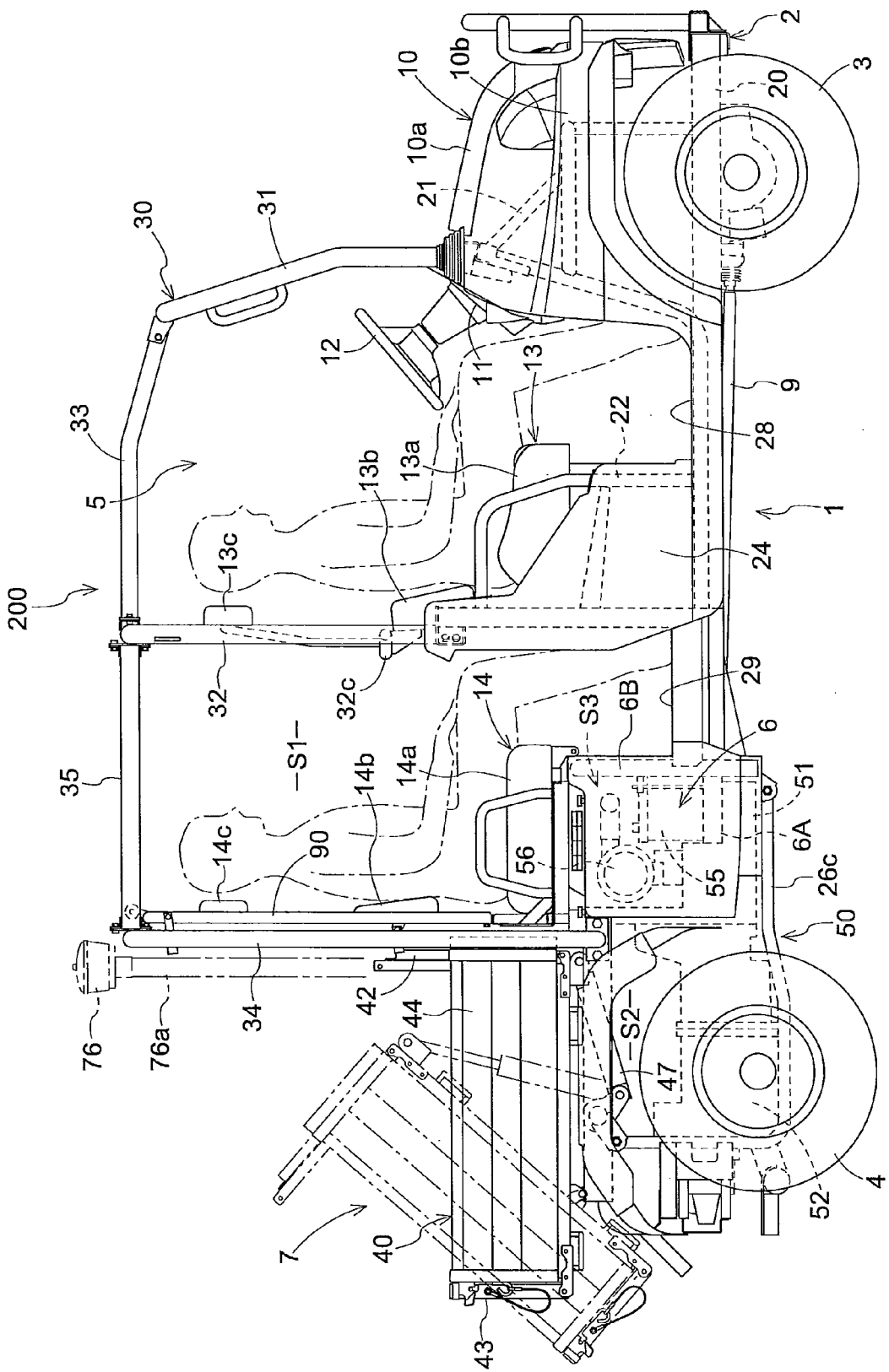
FIG. 1 is a side view of an entire work vehicle in a two-row seat mode.
Figure 2:
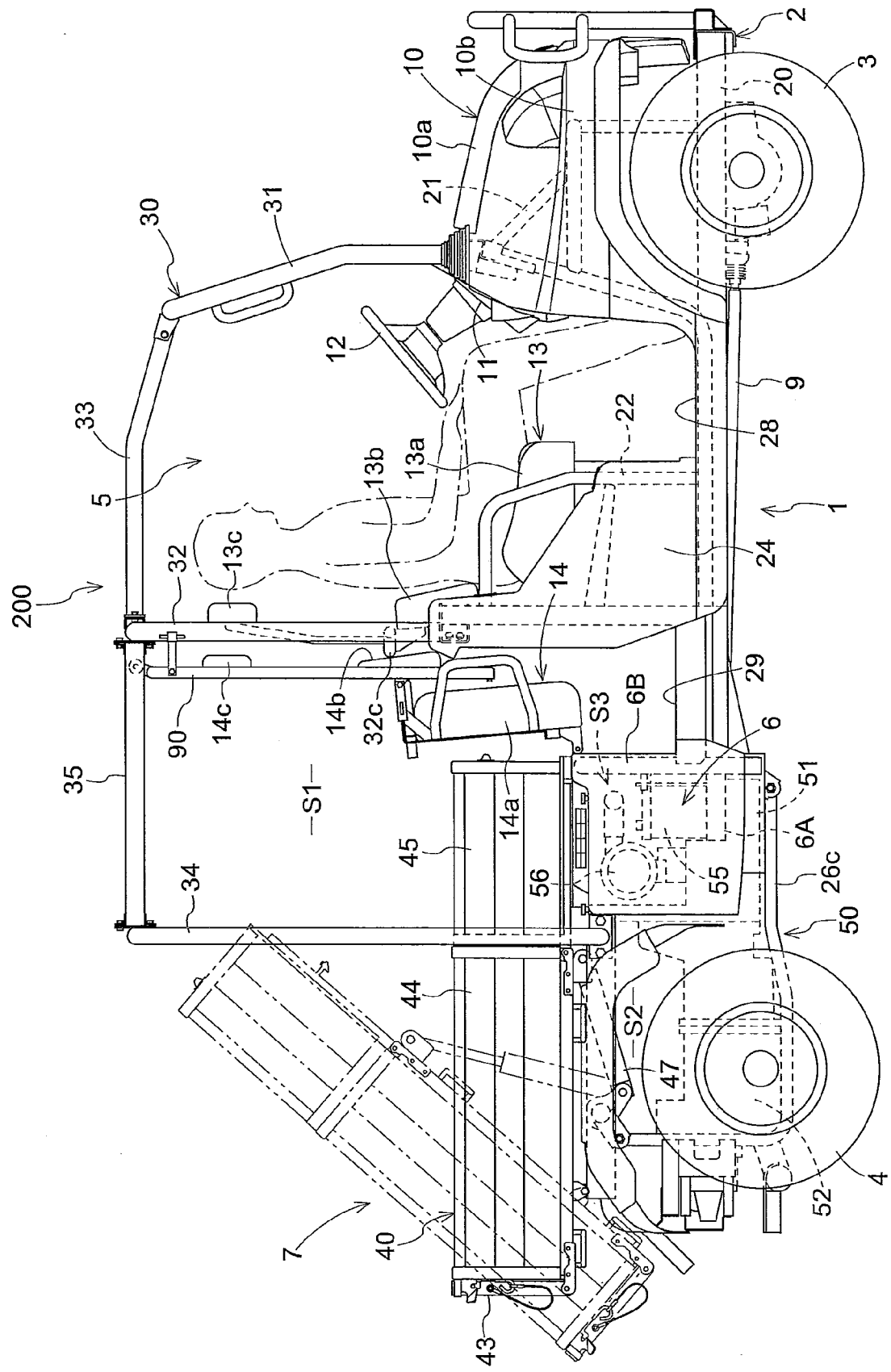
FIG. 2 is a side view of the entire work vehicle in a single row seat mode.
Figure 3:
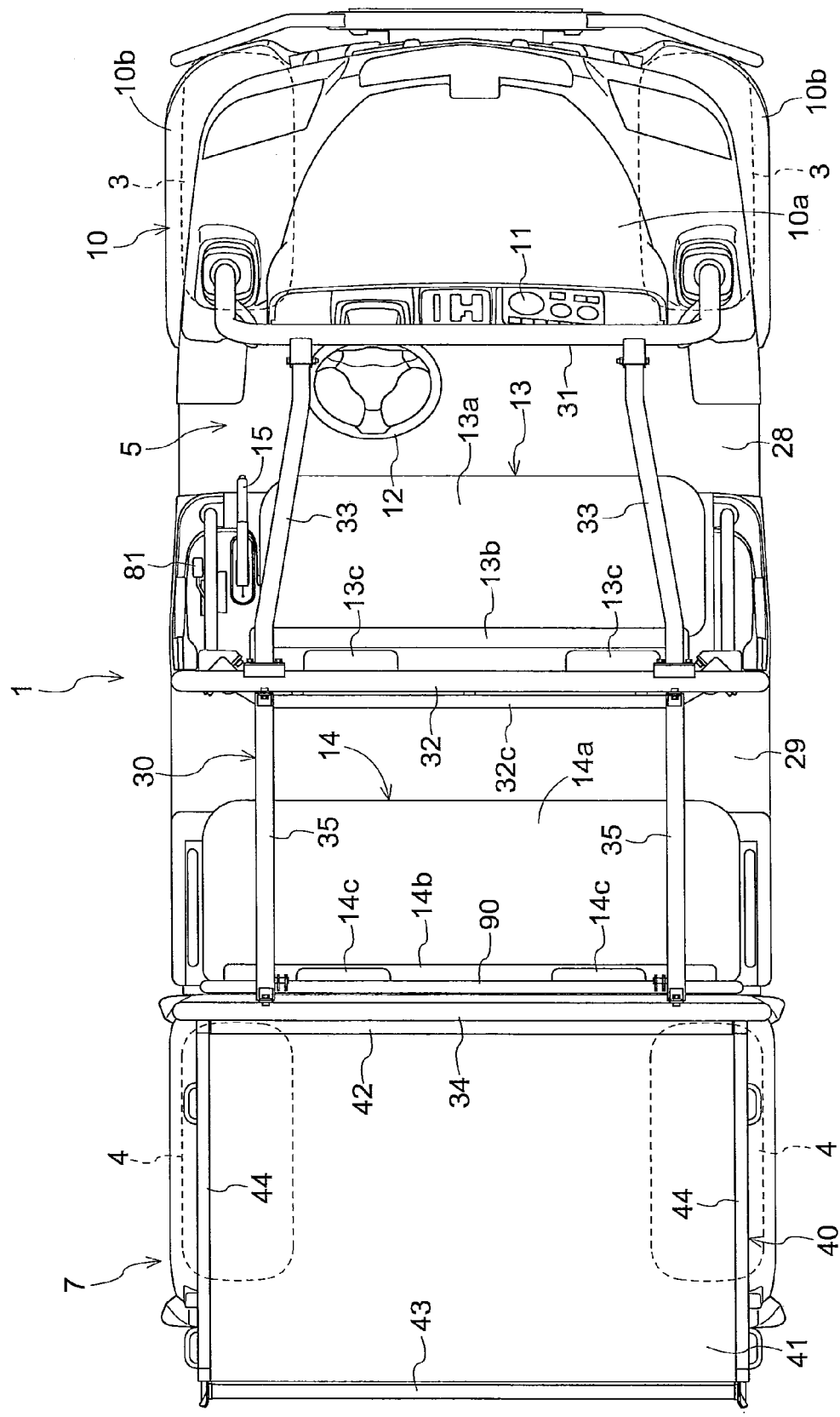
FIG. 3 is a plan view of the entire work vehicle in the two-row seat mode.

FIG. 1 is a side view of an entire work vehicle in a mode in which driver/passengers can be seated in front and rear rows, and FIG. 2 is a side view of the entire work vehicle in a mode in which driver/passenger can be seated in the front row only. FIG. 3 is a plan view of the entire work vehicle in the mode of FIG. 1.

As shown in FIGS. 1-3, a vehicle body 1 is formed as a four-wheel drive type four-wheel car that includes right and left front wheels 3 steerably supported by a front portion of a body frame 2 and right and left rear wheels 4 non-steerably supported by a rear portion of the body frame 2.

In an intermediate portion in a longitudinal direction of the vehicle body 1, there is provided a drive part 5 changeable between a two-row seat mode shown in FIG. 1 in which driver/passengers can be seated on a front driver's seat 13 and a rear seat 14 (four- or five-seater) and a single row seat mode shown in FIG. 2 in which driver/passenger can be seated on the front driver's seat 13 (two-seater).

Rearward of the drive part 5, a rear loading part 7 having a truck box 40 is disposed which is switchable between an extended state and a contracted state (which will be described below) and can perform dumping. Between the drive part 5 and the rear loading part 7, a partition member 90 is disposed which is configured to separate the drive part 5 from the rear loading part 7 (forming a rear wall of the drive part 5).

The rear seat 14 is configured to be switchable between a use position at which the seat is spread out and passengers can be seated, and a non-use position at which a rear side of the rear seat 14 is lifted and folded and passengers cannot be seated. A rear seat installing space S1 is a space rearward of the drive part 5 for providing such a rear seat 14.

Below the rear portion of the body frame 2, a motor part 50 having an engine 51 as a driving power source of the work vehicle is disposed. The power output from the engine 51 is transmitted to a hydrostatic transmission mechanism 53 through a transmission case 52, and the right and left rear wheels 4 are rotationally driven by continuously shifted power by the hydrostatic transmission mechanism 53 (see FIG. 11).

From the transmission case 52, a front wheel drive shaft 9 extends frontward, and to the front wheel drive shaft 9, the right and left front wheels 3 are interlockably connected through a front wheel differential device (not shown). With this configuration, the power from the engine 51 is transmitted through the hydrostatic transmission mechanism 53 and the transmission case 52 to the front wheel differential device, and the right and left front wheels 3 are rotationally driven.

<Vehicle Body Structure>

The vehicle body 1 has a vehicle body core part 200 including: the body frame 2 supported by the front wheels 3 and the rear wheels 4; and a ROPS 30 which is configured to cover the drive part 5 and attached to the body frame 2.

Figure 4:
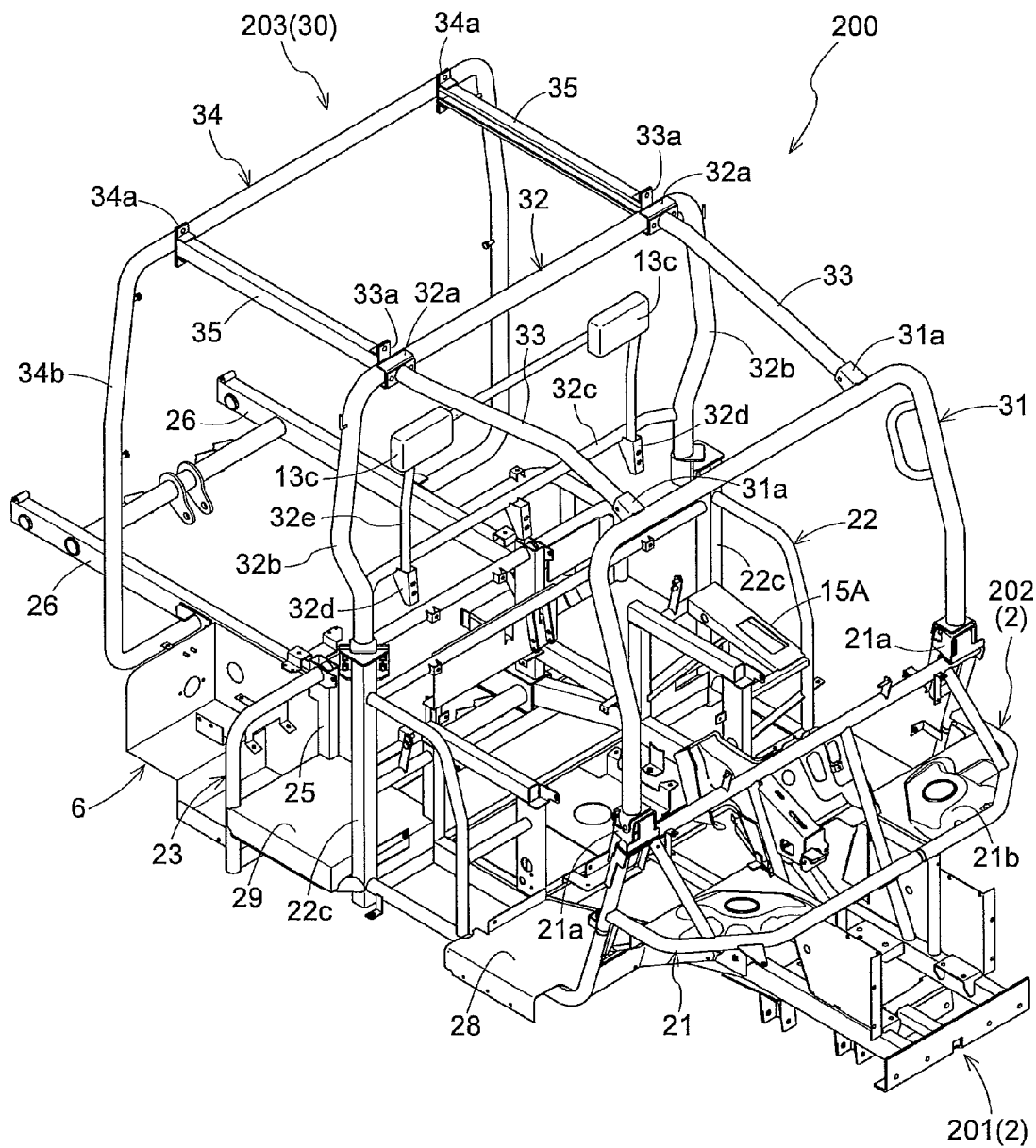
FIG. 4 is a perspective view showing a vehicle body core part.
Figure 5:
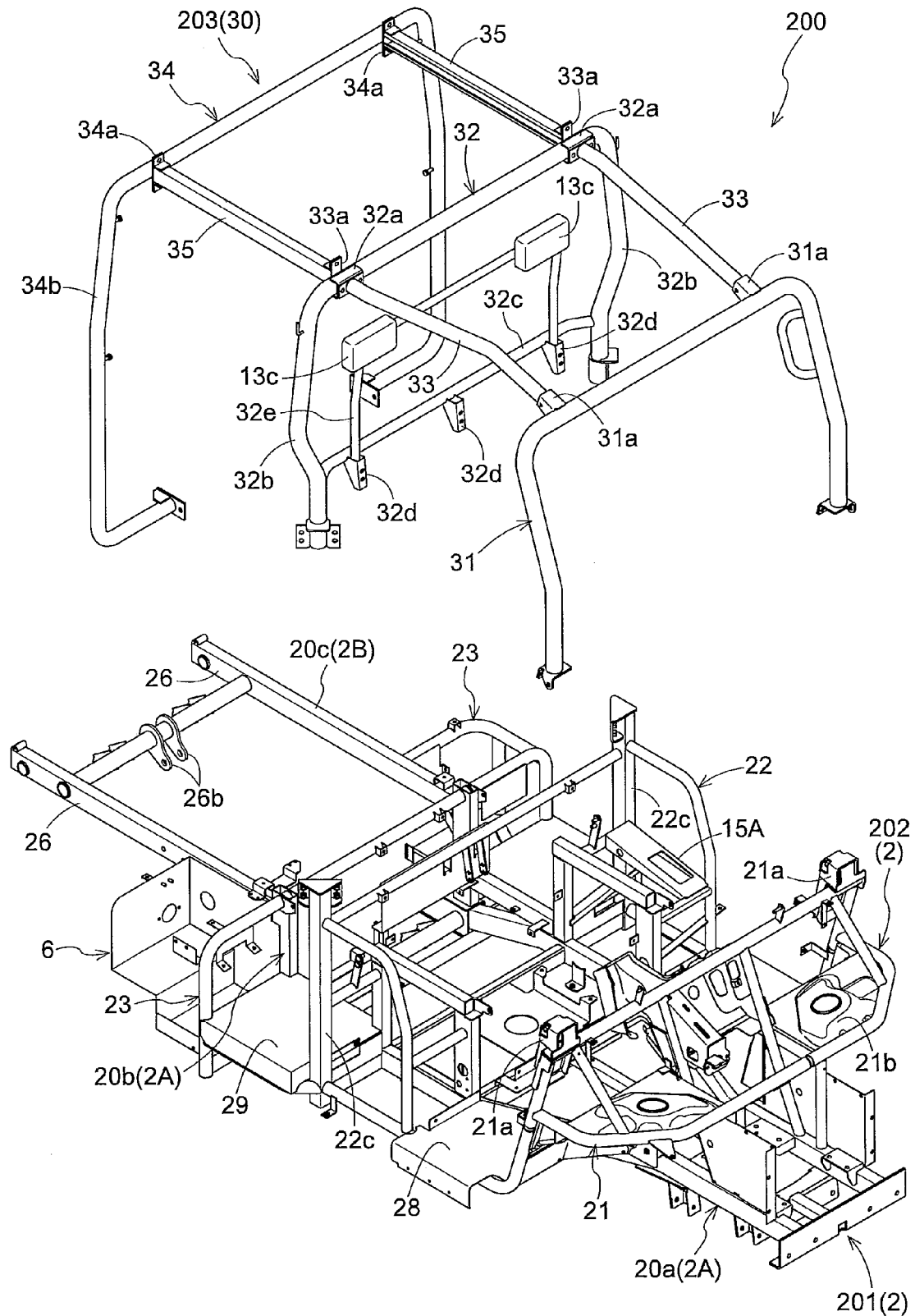
FIG. 5 is a perspective view showing a state in which a body frame and a ROPS are separated.
Figure 6:
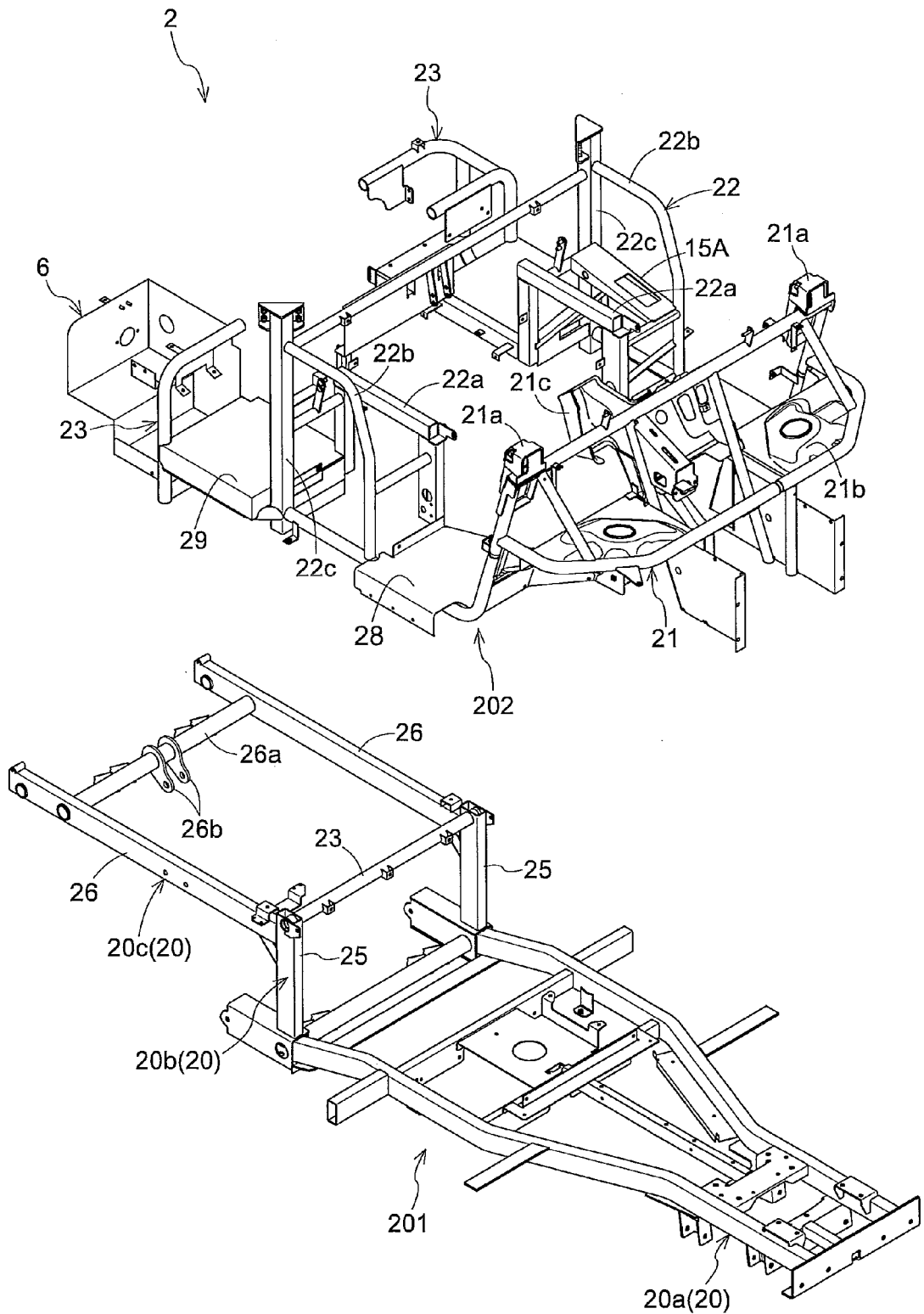
FIG. 6 is a perspective view showing a state in which a first core member and a second core member are separated.

As shown in FIGS. 4-6, the vehicle body core part 200 includes: a first core member 201 formed mainly of a main frame 20; a second core member 202 configured to be assembled to the first core member 201 in a unified manner; and a third core member 203 formed of the ROPS 30. The body frame 2 includes a combination of the first core member 201 and the second core member 202.

As shown in FIG. 6, the first core member 201 includes: the right and left main frames 20 each made of a square pipe extending in the longitudinal direction; and brackets for mounting various equipments.

The main frame 20 includes: a pair of right and left main frame front portions 20a extending along a vehicle longitudinal direction in a front portion of the vehicle body 1; a pair of main frame standing portions 20b each standing upright from a rear end portion of the main frame front portion 20a; and a pair of main frame rear portions 20c each extending rearward from an upper end of the main frame standing portion 20b. The entire main frame 20 is configured to have an approximate crank shape as a side view.

The main frame standing portion 20b is formed of a rear seat support frame 25 that erects upward from the rear end portion of the main frame front portion 20a, and the main frame rear portion 20c is formed of a truck box support frame 26 extending rearward from an upper portion of the rear seat support frame 25. A rear suspension 4a bridges the rear end portion of the main frame front portion 20a and the main frame rear portion 20c, through which suspension the rear wheel 4 is connected and supported.

As shown in FIG. 6, the second core member 202 includes: a front wheel support frame 21 configured to support a steering wheel 12 and the right and left front wheels 3; a front driver's seat constitutive frame 22 configured to be provide with the front driver's seat 13; and a rear seat constitutive frame 23 configured to be provided with the rear seat 14. In addition, the second core member 202 further includes a front deck plate 28 serving as a floor of the drive part 5 (driver floor) frontward of the front driver's seat 13, and a rear deck plate 29 serving as a floor of the drive part 5 frontward of the rear seat 14.

The front wheel support frame 21 includes: receiving portions 21a configured to receive respective front poles of the ROPS 30, and provided in an upper portion of each of right and left end portions of the front wheel support frame 21; front wheel support portions 21b each configured to support the front wheel 3 in an independently suspended state through a suspension spring receiving portion provided on a corresponding front lateral side; and a steering wheel support portion 21c for the steering wheel 12 for steering the right and left front wheels 3, provided on an upper side of a central portion in the vehicle transverse direction.

The front driver's seat constitutive frame 22 includes: seat support portions 22a each in a shape of a gate disposed above the corresponding right and left main frames 20 so as to support a front sitting portion 13a of the front driver's seat 13; pipe frames 22b each of which is configured to serve as a passenger arm rail extending upward from each of lateral rear portions of the front wheel support frame 21 and is positioned outward in the transverse direction of the seat support portion 22a; and support frames 22c each of which is made of a square pipe extending upward from each of lateral rear portions of the front driver's seat 13 and is positioned rearward of the front wheel support frame 21.

Together with the rear seat support frames 25 formed of the main frame standing portions 20b and front end portions of the truck box support frames 26, the rear seat constitutive frame 23 is configured to support the rear seat 14.

To the front portion of the vehicle body 1 is attached a front cover 10 which includes: an upper cover 10a configured to cover the front wheel support frame 21 positioned in the front portion of the vehicle body 1 from above; and a lower cover 10b configured to cover the front portion of the vehicle body 1 from front and lateral sides. An operation panel 11 configured to cover a front side of the drive part 5 is provided rearward of the front cover 10, and the steering wheel 12 for steering the right and left front wheels 3 extends from a left side portion of the operation panel 11.

The front driver's seat constitutive frame 22 is surrounded by a front seat support panel 24 in a box shape to which the front driver's seat 13 is fixed. The front driver's seat 13 includes: the front sitting portion 13a fixed to a front portion of the front seat support panel 24; and a seat back 13b fixed to a reinforcing frame 32c connecting the intermediate poles 32 of the ROPS 30 (which will be described later).

To an upper face of the main frame front portion 20a positioned frontward of the front driver's seat constitutive frame 22, the front deck plate 28 is fixed, by which a floor face of a front portion of the drive part 5 is provided. In addition, to the upper face of the main frame front portion 20a positioned frontward of the rear seat constitutive frame 23 and the rear seat support frames 25, the rear deck plate 29 is fixed, by which a floor face of a rear portion of the drive part 5 is provided.

The main frame front portion 20a has a portion extending rearward from the seat support frame 25, to which a front end portion of a rear support frame 26c for supporting the engine 51, the transmission case 52 and the like in a suspended manner (which will be described later), is connected. This extending portion is also configured to serve as a supporting member for a container box 6 for a battery 55, an air cleaner 56 and the like (which will be described later).

Above the rear seat constitutive frame 23 and the rear seat support frames 25, the rear seat 14 is mounted. The rear seat 14 includes: a rear sitting portion 14a supported swingably in the longitudinal direction on upper end portions of the rear seat support frames 25, and a seat back 14b fixed to a front face of the partition member 90 (which will be described below).

As described above, the body frame 2 includes a combination of the first core member 201 formed mainly of the main frame 20, and the second core member 202 mounted on and assembled to the main frame 20 in a unified manner.

In the body frame 2, a combination of the main frame front portion 20a positioned in a front portion of the main frame 20, the main frame standing portion 20b, and the second core member 202 constitute a front frame 2A; and the main frame rear portions 20c formed of the truck box support frames 26 constitute a rear frame 2B.

<Structure of ROPS>

On the body frame 2 configured as described above, the ROPS 30 is mounted in the following manner to form the vehicle body core part 200.

Figure 9:
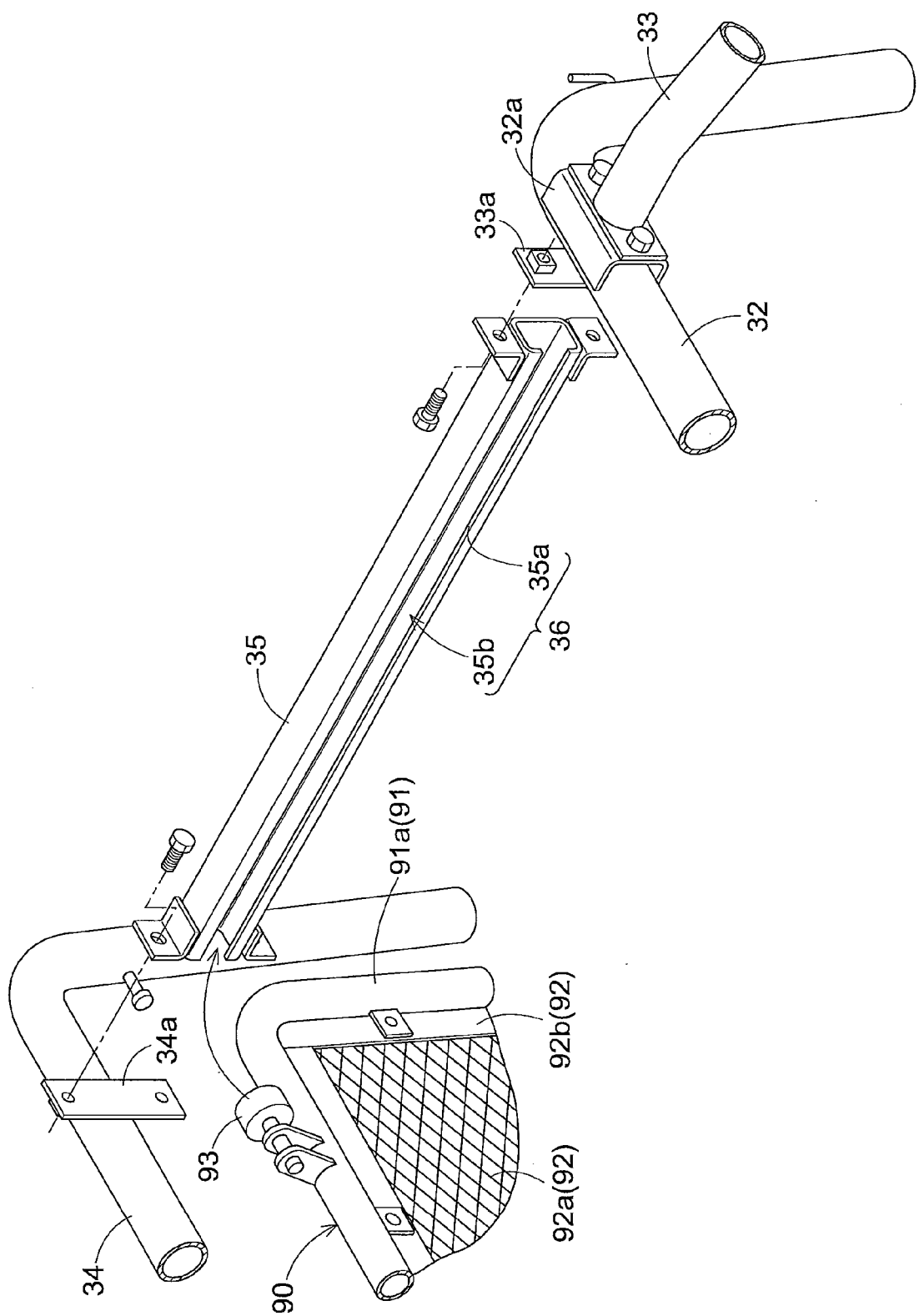
FIG. 9 is a perspective view illustrating a supporting structure of an upper portion of the partition member.

As shown in FIGS. 4, 5 and 9, the ROPS 30 is configured as a six-post type, which includes a front pole 31, an intermediate pole 32 and a rear pole 34, each formed in a shape of a gate. The right and left front pole receiving portions 21a are fixed to lateral sides of an upper portion of the front wheel support frame 21. The front pole 31 made of a round pipe bridges the right and left front pole receiving portions 21a and is fixed thereto. The intermediate pole 32 made of a round pipe bridges upper portions of the right and left support frames 22c of the front driver's seat constitutive frame 22 and is fixed thereto.

Right and left first brackets 31a are fixed to respective lateral sides of an upper portion of the front pole 31, and right and left second brackets 32a facing frontward are fixed to respective lateral sides of an upper portion of the intermediate pole 32. Right and left front longitudinal frames 33, each made of a round pipe, bridge the right and left first brackets 31a and the right and left second brackets 32a, respectively, and are fastened to the brackets. The reinforcing frame 32c bridges lower portions of right and left vertical frame portions 32b of the intermediate poles 32 and are fixed thereto. The reinforcing frame 32c serves as an arm rail for a passenger seated on the rear seat 14.

Figure 7:
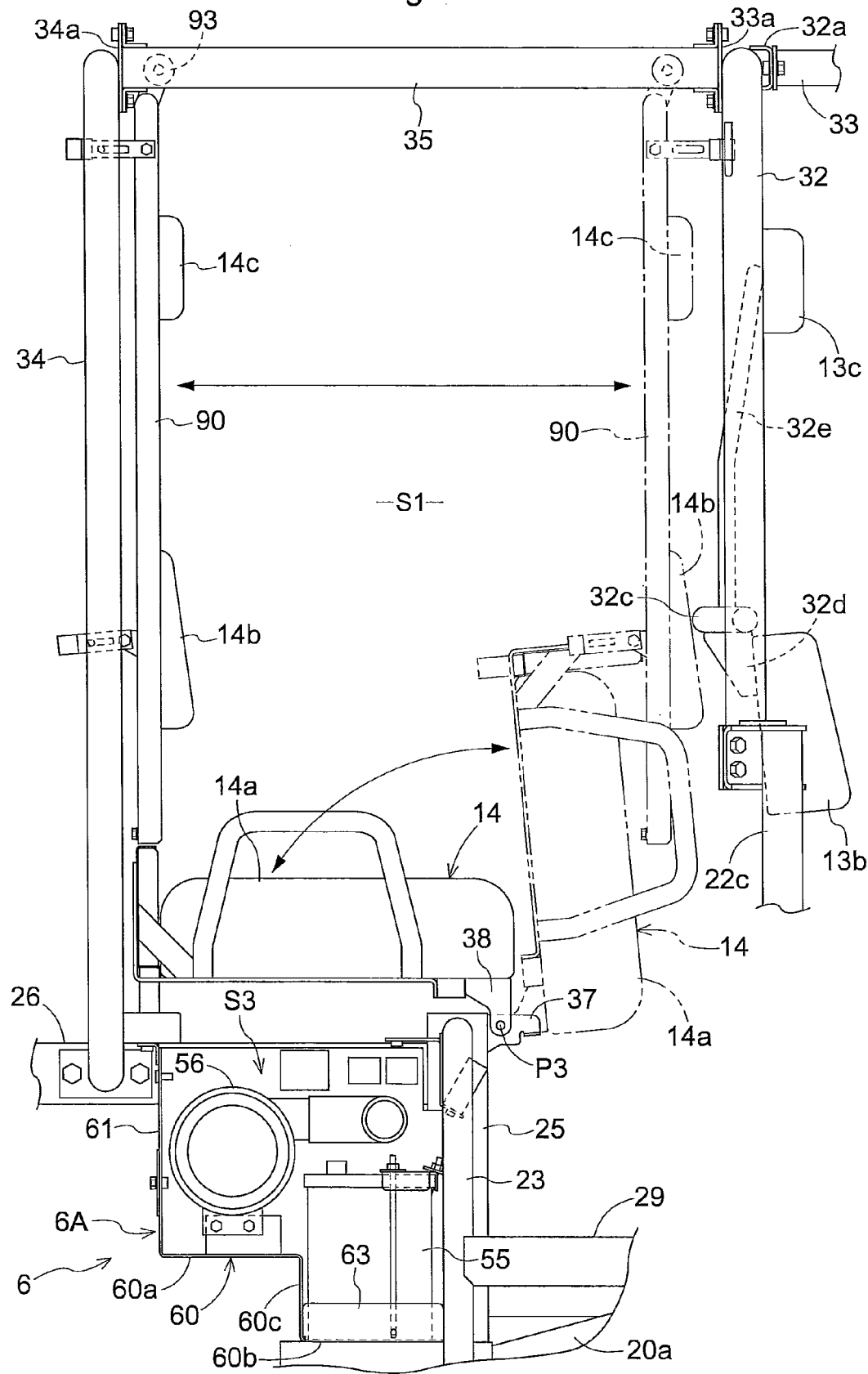
FIG. 7 is a side view of around a partition member.

To the reinforcing frame 32c are fixed mounting brackets 32d, and to a front face of each mounting bracket 32d is fastened the seat back 13b of the front driver's seat 13 (see FIG. 7).

To the mounting brackets 32d provided on the reinforcing frame 32c, lower ends of a gate-shaped head rest frame 32e are welded. To each of lateral sides of an upper portion of the gate-shaped head rest frame 32e, a head rest 13c for the front seat is attached.

The rear pole 34 is made of a round pipe, and right and left fourth brackets 34a are fixed to respective lateral sides of an upper portion of the rear pole 34, and right and left third brackets 33a facing rearward are fixed to respective lateral sides of the upper portion of the intermediate pole 32. Right and left rear longitudinal frames 35, each formed of a member having a channel-shaped cross section, bridge the right and left fourth brackets 34a and the right and left third brackets 33a, respectively, and are fastened to the brackets.

Right and left lower ends of the rear pole 34 are removably connected to lateral outer faces of the right and left truck box support frames 26, respectively.

Since the rear pole 34 and the rear longitudinal frames 35 are removably attached, the right and left lower ends of the vertical rear pole 34 may be removed from the right and left truck box support frames 26 and the rear longitudinal frames 35 may be removed from the intermediate pole 32, to thereby convert the ROPS 30 from a six-post type into a four-post type.

In addition, as shown in FIG. 7, in the ROPS 30, each of the front pole 31, the intermediate pole 32, the rear pole 34, the front longitudinal frames 33, and the rear longitudinal frames 35 is configured to be detachably assembled.

<Description of Partition Member>

Figure 8:
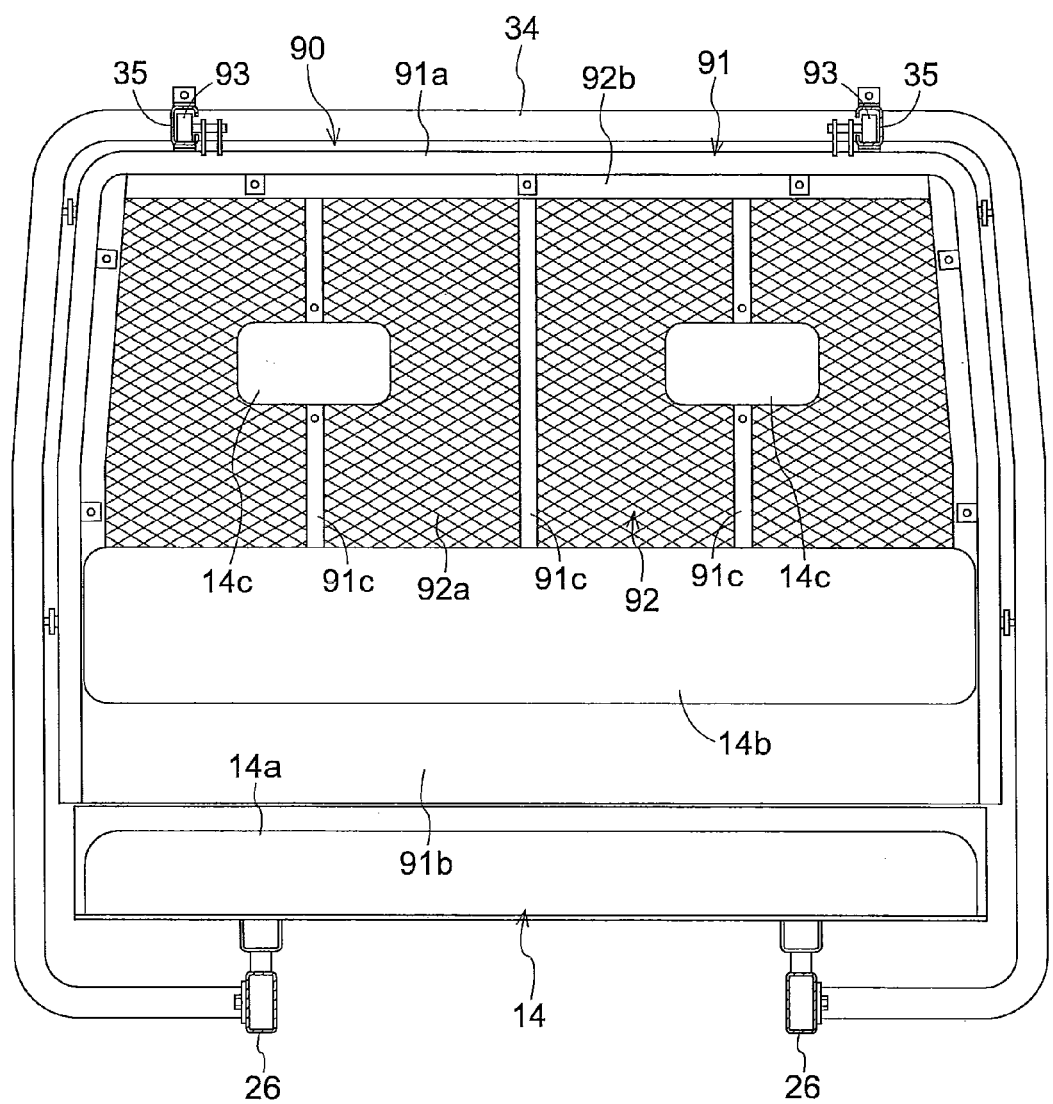
FIG. 8 is a rear view of around the partition member.

Referring to FIGS. 1, 2 and 7-9, a structure of the partition member 90 disposed between the drive part 5 and the rear loading part 7 will be described. FIG. 7 is a side view around the partition member 90, FIG. 8 is a rear view around the partition member 90, and FIG. 9 shows a supporting structure of an upper portion of the partition member 90.

As shown in FIGS. 1, 2 and 7, the rear portion of the drive part 5 is provided with the partition member 90 separating the drive part 5 from the rear loading part 7 (forming a rear wall of the drive part 5), and the partition member 90 is configured to change the position thereof between a backward shifted position at which the partition member 90 is moved backward with the truck box 40 in the contracted state (a position indicated with a solid line in FIG. 1) and a forward shifted position at which the partition member 90 is moved forward with the truck box 40 in the extended state (a position indicated with a solid line in FIG. 2).

As shown in FIG. 8, the partition member 90 includes a frame member 91, a net-shaped member 92, and upper support rollers 93 provided on both lateral sides of an upper portion of the frame member 91.

The frame member 91 includes an upper peripheral frame 91a in a gate shape formed in such a manner that the round pipe is bent along an inner rim of the rear pole 34 and a lower peripheral frame 91b in a shape of a plate bridging lower portions of lateral ends of the upper peripheral frame 91a. The net-shaped member 92 includes a frame 92b made of band plates, and a net 92a having a plurality of ventilation holes, such as metal mesh, resin mesh and perforated metal, which is attached to the frame 92b.

To a front side of the lower peripheral frame 91b, the seat back 14b of the rear seat 14 is fastened, so that the seat back 14b of the rear seat 14 moves together with the partition member 90. In addition, on a front side of the net 92a, vertical frames 91c configured to connect the lower peripheral frame 91b with an upper portion of the upper peripheral frame 91a is provided, and head rests 14c are provided on an intermediate position of the vertical frames 91c in a vertical direction.

As shown in FIGS. 4, 8 and 9, the rear longitudinal frame 35 connecting the upper portion of the intermediate pole 32 and the upper portion of the rear pole 34 is configured to have a channel having an inward opening, as a vertical sectional view seen from a front.

The rear longitudinal frame 35 includes: a long guide trench 35a extending in the longitudinal direction formed by a channel-shaped opening as a sectional view oriented inward in the transverse direction; and a roller guide portion 35b configured to make an inner space of the guide trench 35a accessible by the upper support roller 93 of the partition member 90 and to allow the upper support roller 93 fitted thereinto to roll along. The guide trench 35a and the roller guide portion 35b constitutes a guide rail portion 36 elongated in the longitudinal direction.

The partition member 90 whose upper support rollers 93 are fitted into the guide rail portions 36 is configured to change the position thereof between the backward shifted position at which the partition member 90 is fixed to the rear pole 34 as shown with a solid line in FIG. 7, and the forward shifted position at which the partition member 90 is fixed to the intermediate pole 32 on a front side as shown with an imaginary line in FIG. 7.

<Structure of Truck Box>

Figure 10:
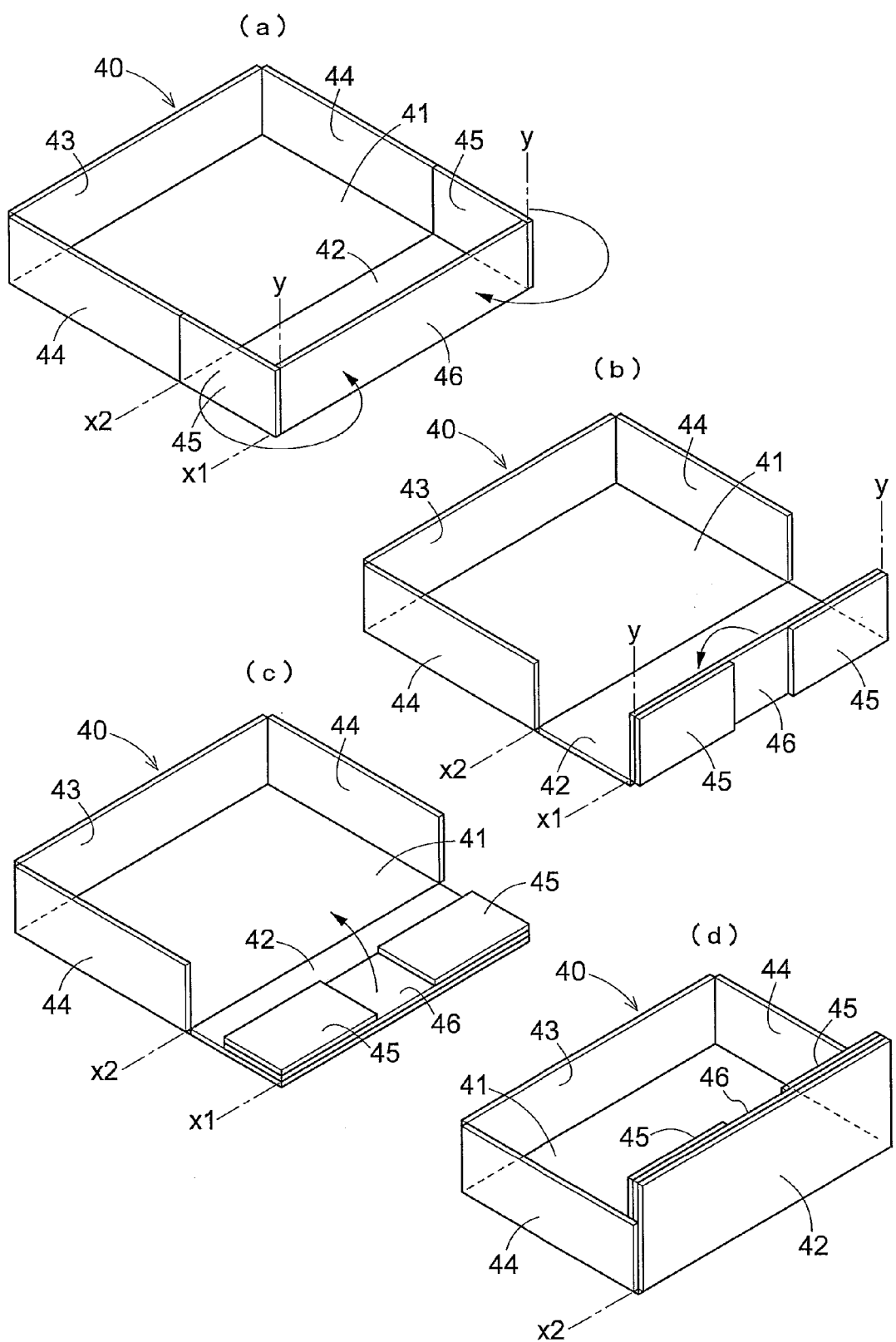
FIG. 10 is a schematic perspective view of a truck box.

Referring to FIGS. 1, 2 and 10, a structure of the truck box 40 will be described.

As shown in FIGS. 1, 2 and 10, the truck box 40 includes: a rear bed portion 41 configured to load an object; a front bed portion 42 for loading an object; a rear wall 43 forming a rear face of the truck box 40; right and left rear lateral walls 44 forming side faces of a rear portion of the truck box 40; right and left front lateral walls 45 forming side faces of a front portion of the truck box 40; and a front wall 46 forming a front face of the truck box 40.

With this structure, the truck box 40 is configured to be switchable between the extended state (first state) shown in FIG. 2 and (a) in FIG. 10 in which an entire length of the truck box 40 becomes long by moving frontward the front portion of the truck box 40 (the front wall 46, the front lateral wall 45 and the front bed portion 42), and the contracted state (second state) shown in FIG. 1 and (d) in FIG. 10 in which the entire length of the truck box 40 becomes short by moving rearward the front portion of the truck box 40 (the front wall 46, the front lateral wall 45 and the front bed portion 42).

Referring to FIG. 10, a switching operation of the truck box 40 between the extended state and the contracted state will be described.

FIG. 10 is a schematic perspective view showing switching of states of the truck box 40, in which (a) shows the extended state, (b) and (c) show intermediate states between the extended state and the contracted state, and (d) shows the contracted state.

As shown in (a) and (b), the right and left front lateral walls 45 are initially erected and fixed to the front bed portion 42, and then the right and left front lateral walls 45 are swung outward (frontward) about the corresponding vertical axis y, and fixed to a front side of the front wall 46.

Next, as shown in (b) and (c), the front wall 46 is swung rearward about a transversal axis x1, and the front wall 46, together with the right and left front lateral walls 45, is folded to a front bed portion 42 side.

Next, as shown in (c) and (d), the front bed portion 42 is swung rearward about a transversal axis x2, and are erected together with the folded right and left front lateral walls 45 and the front wall 46, to form a front wall of the contracted truck box 40 as shown in (d).

<Position Change of Rear Seat>

As shown in FIG. 7, a lower portion of a front rim of the rear sitting portion 14*a* of the rear seat 14 is supported swingably in front-rear and vertical directions about a transversal shaft P3, and the rear seat 14 is configured to be switchable between an erected position at which the rear sitting portion 14*a* has been swung frontward with a front end rim being positioned downward and a rear end rim being positioned upward, and a seatable position at which the rear sitting portion 14*a* has been swung rearward with an upper face of the rear sitting portion 14*a* being oriented upward.

To an upper portion of a front portion of the rear seat support frame 25, a bracket 37 is fixed. On the bracket 37, a support bracket 38 fixed to a front lower portion of the rear sitting portion 14*a* is supported swingably about the transversal shaft P3.

With this configuration, by moving frontward the seat back 14*b* together with the partition member 90, and by changing the position of the rear sitting portion 14*a* to the erected position, the rear seat 14 can be brought to a first position at which the rear seat 14 is in a non-use mode in which an operator cannot be seated, on a front side of the truck box 40 in the extended state.

By changing the position of the rear sitting portion 14*a* to a position in which the rear sitting portion 14*a* has been swung rearward, and rearward moving the seat back 14*b* together with the partition member 90, the rear seat 14 can be brought to a second position at which the rear seat 14 is in a use mode in which an operator can be seated, on the front side of the truck box 40 in the contracted state.

The first position and second position of the rear sitting portion 14*a* and the partition member 90 are configured to be releasably fixed using a lock mechanism (not shown).

<Configuration of Motor Part>

The motor part 50 disposed below the rear portion of the body frame 2 is configured as follows.

Figure 11:
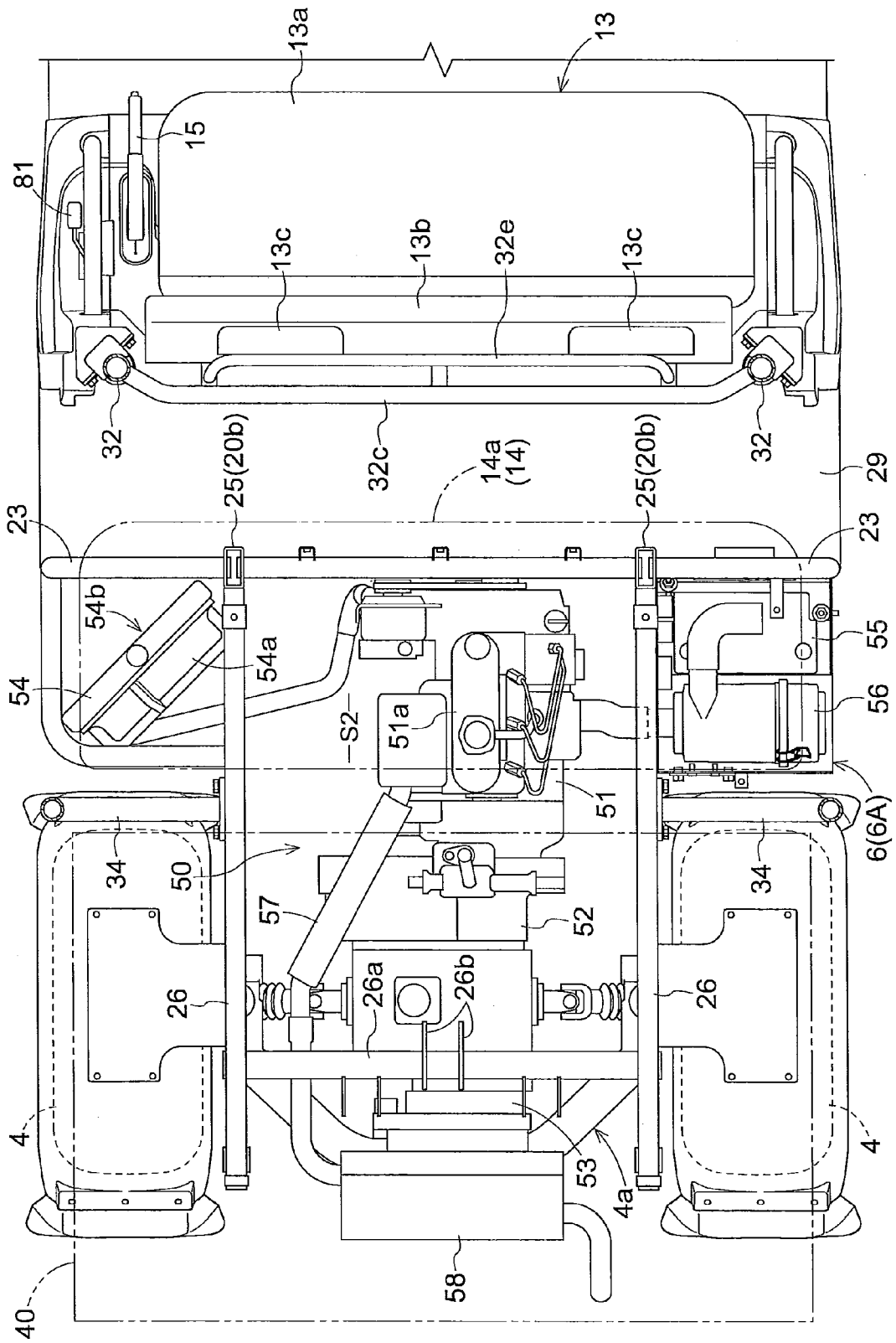
FIG. 11 is a plan view showing a motor part.

As shown in FIGS. 1, 2 and 11, the engine 51 as a driving power source of the work vehicle, the transmission case 52 connected to a rear portion of the engine 51, and the hydrostatic transmission mechanism 53 connected to a rear portion of the transmission case 52 are connected in a unified manner in the motor part 50. These are supported in a suspended manner by a support frame 26*a* bridging the right and left truck box support frames 26, as well as the rear support frames 26*c* bent in an L-shape as a side view extending from the support frame 26*a* to an end portion of the main frame front portion 20*a* below the front portion of the vehicle body 1.

It should be noted that, as shown in FIGS. 1, 6 and 11, mounting brackets 26*b* attached to an intermediate portion of the support frame 26*a* are configured to receive and support a lower end of a dump cylinder 47 for performing a dumping operation of the truck box 40.

The transmission case 52 connected to the rear portion of the engine 51 is configured to receive a power of an engine output shaft (not shown) extending rearward from a crankcase portion (not shown) below the engine 51 and to transmit a driving power to the rear wheel 4. An exhaust pipe 57 extends from a left side of a cylinder portion 51*a* of the engine 51, and passes by a left side of the transmission case 52. Exhaust is lead to a muffler 58 disposed above a rear portion of the transmission case 52 and below the truck box 40.

The engine 51 in the motor part 50 is disposed near a central portion in the transverse direction of the rear seat 14 at a position downward of the rear sitting position 14*a* in the second position, as shown with an imaginary line in FIG. 11. By changing the position to the first position in which the rear sitting portion 14*a* is erected, an upper side of the engine 51 is exposed.

It should be noted that, as shown in FIG. 11, since the transmission case 52 and the like are present under the truck box 40, when the dumping operation of the truck box 40 is performed, the motor part 50 thereunder is exposed, and maintenance and inspection of the transmission case 52 and the like becomes facilitated.

On a left side of the engine 51, a radiator 54 having an electrically-operated cooling fan 54*a* is disposed, and on the other side (right side), the container box 6 is disposed, in which the battery 55 and the air cleaner 56 are placed.

By distributing the radiator 54, and the battery 55 with the air cleaner 56 on both sides of the engine 51 in this manner, as compared with a case where the radiator 54, the battery 55 and the air cleaner 56 are disposed on one side of the engine 51, a lateral balance of the vehicle body can be advantageously improved.

The radiator 54 is disposed below the rear sitting portion 14*a* in the second position, and by switching the position to the first position in which the rear sitting portion 14*a* is erected, an upper side of the radiator 54, together with the engine 51, is exposed.

As shown in FIG. 11, a suction face 54*b* of the radiator 54 facing outward is obliquely arranged in such a manner that the portion of the suction face 54*b* located more frontward in the vehicle longitudinal direction is located more inside of the vehicle body. A blowing direction of air from the cooling fan 54*a* is set to be oriented obliquely backward so that a center line of the blowing direction as a planar view is directed to a location where the engine 51 and the transmission case 52 are present.

Therefore, the air blown from the cooling fan 54*a* serves as scavenging means for smoothly discharging heat air stayed in the motor part 50 to outside, by passing through a scavenging space S2 (see FIG. 1) formed between an upper face of the transmission case 52 positioned slightly lower than the engine 51 and a lower face of the truck box 40. In addition, since the air blown from the cooling fan 54*a* spreads widely to a certain degree, the air flows obliquely backward while being brought into contact with the engine 51, the transmission case 52, and the hydrostatic transmission mechanism 53, as well as the exhaust pipe 57 and the muffler 58 extending from the engine 51.

Thought not shown, on a back face of the rear seat 14, a lining is provided which is made of a thermally-resistant material having a resistance to heat generated by the engine 51 disposed nearby and at the same time having a heat insulating property and sound absorbency.

<Structure of Container Box>

The container box 6 for containing the battery 55 and the air cleaner 56 is configured as shown in FIGS. 12-15.

The container box 6 includes a fixed case portion 6A fixed to and supported by the body frame 2 and a lid case portion 6B (corresponding to opening-closing lid) removably attached to the fixed case portion 6A, by which a container space S3 is formed inside. By removing the lid case portion 6B from the fixed case portion 6A, the battery 55 and the air cleaner 56 in the container box 6 are exposed so as to be inspected and operated from a lateral outer side of the vehicle body.

The fixed case portion 6A is made of a metallic plate member, and includes: a stepped the bottom plate 60 (corresponding to bottom plate unit); a rear wall plate 61 erecting from a rear end portion of the bottom plate 60; an inner wall plate 62 located on an inner side in the vehicle transverse direction; and a standing piece 63 located on an outer side in the vehicle transverse direction and on a lower step of the bottom plate 60.

The bottom plate 60 includes: a bottom plate higher portion 60a (corresponding to first sub bottom plate) as an upper step; a bottom plate lower portion 60b (corresponding to second sub bottom plate) as a lower step; and a bottom plate intermediate portion 60c as a standing portion disposed between the portions 60a and 60b. The standing piece 63 is vertically arranged on an outer end portion of the bottom plate lower portion 60b.

Figure 12:
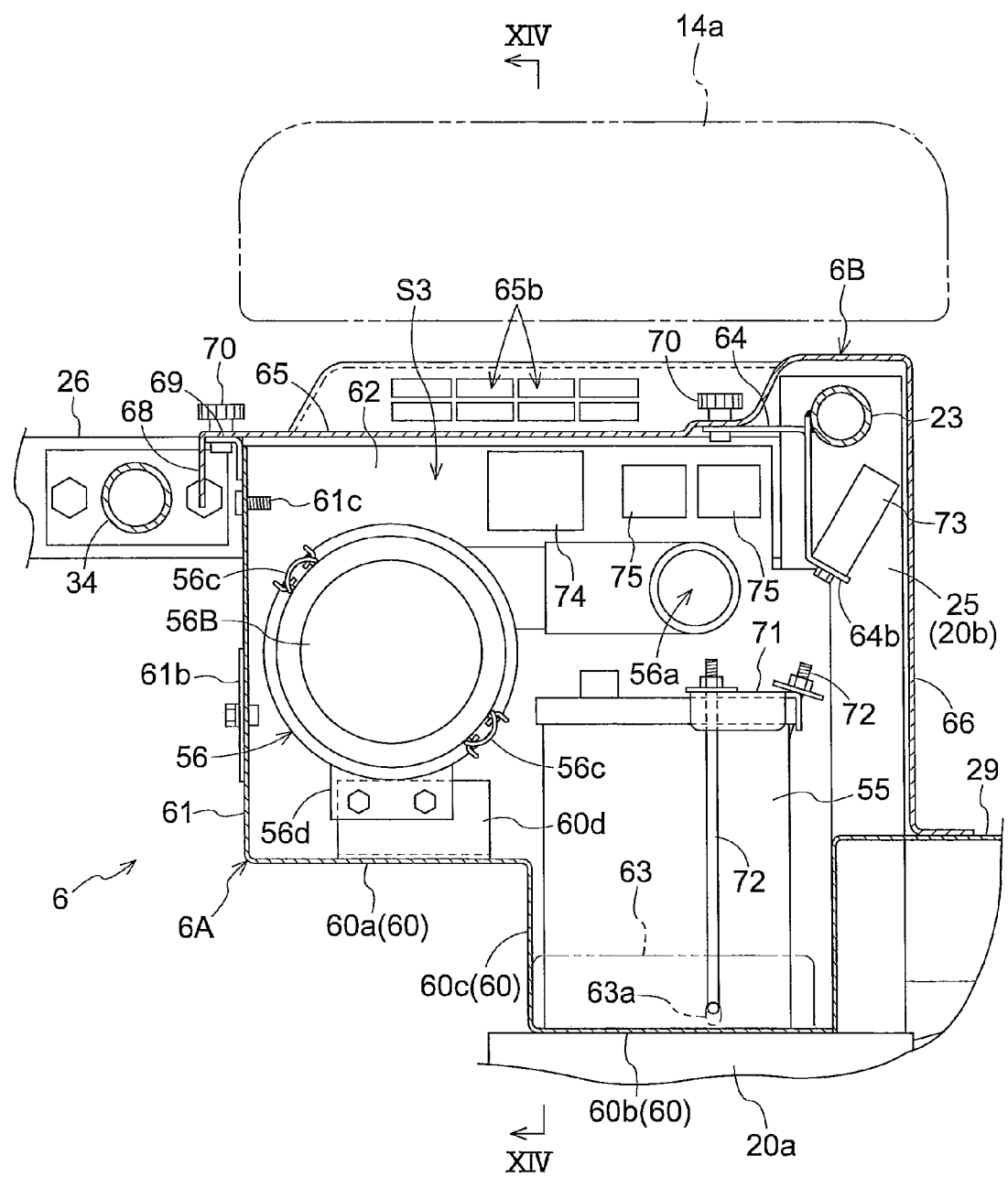
FIG. 12 is a vertical sectional side view of a container space.
Figure 13:
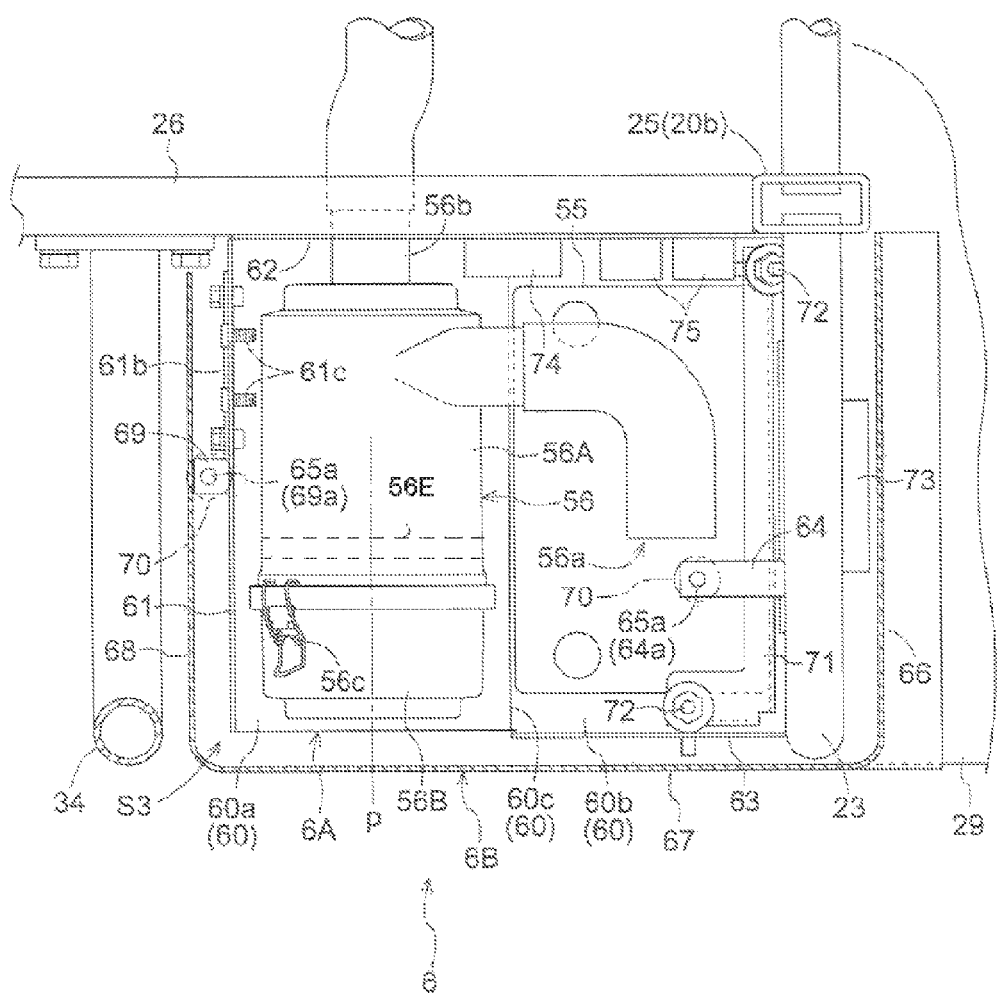
FIG. 13 is a horizontal sectional plan view of the container space.
Figure 14:
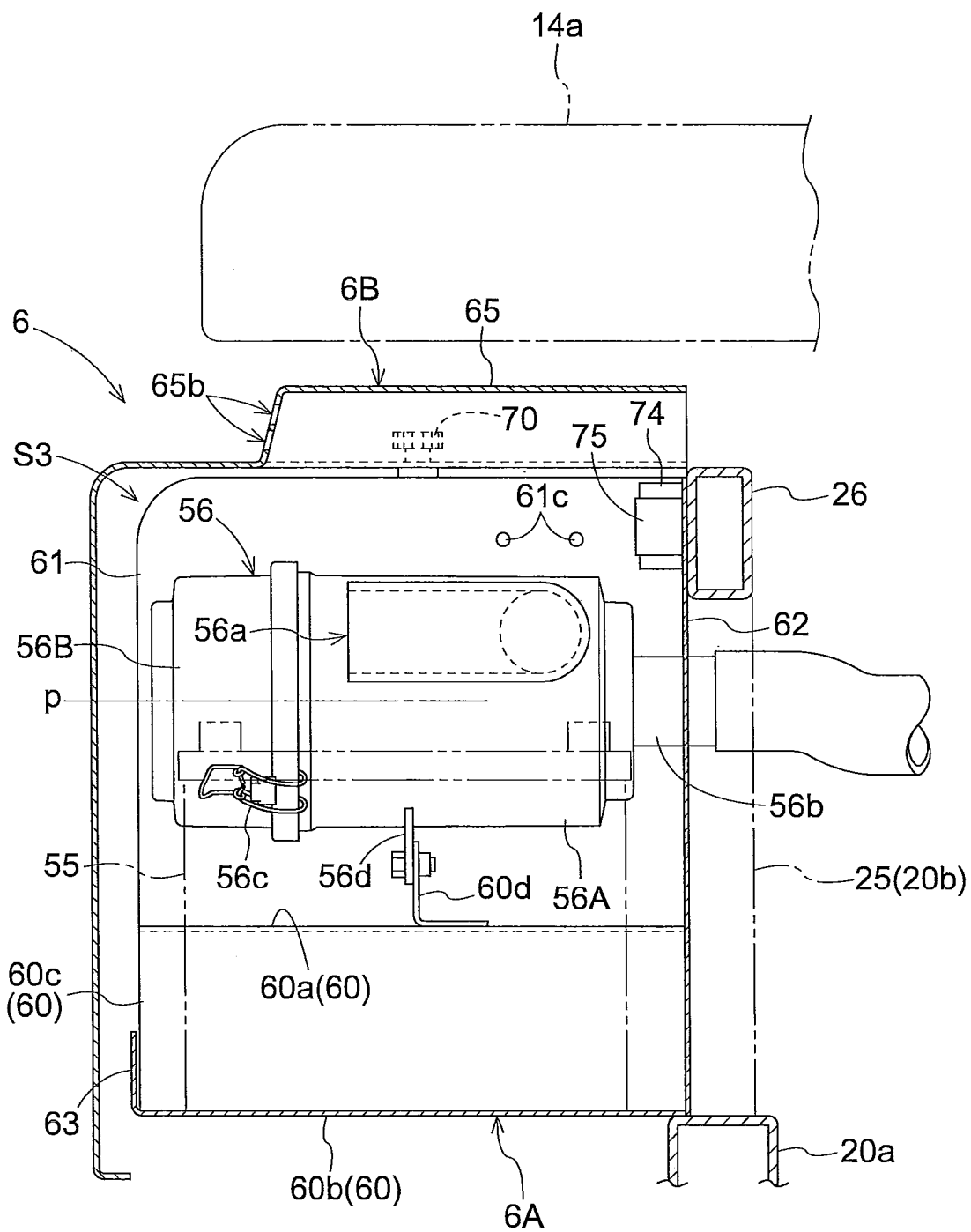
FIG. 14 is a cross-sectional view taken along a line XIV-XIV of the container space in FIG. 12.
Figure 15:
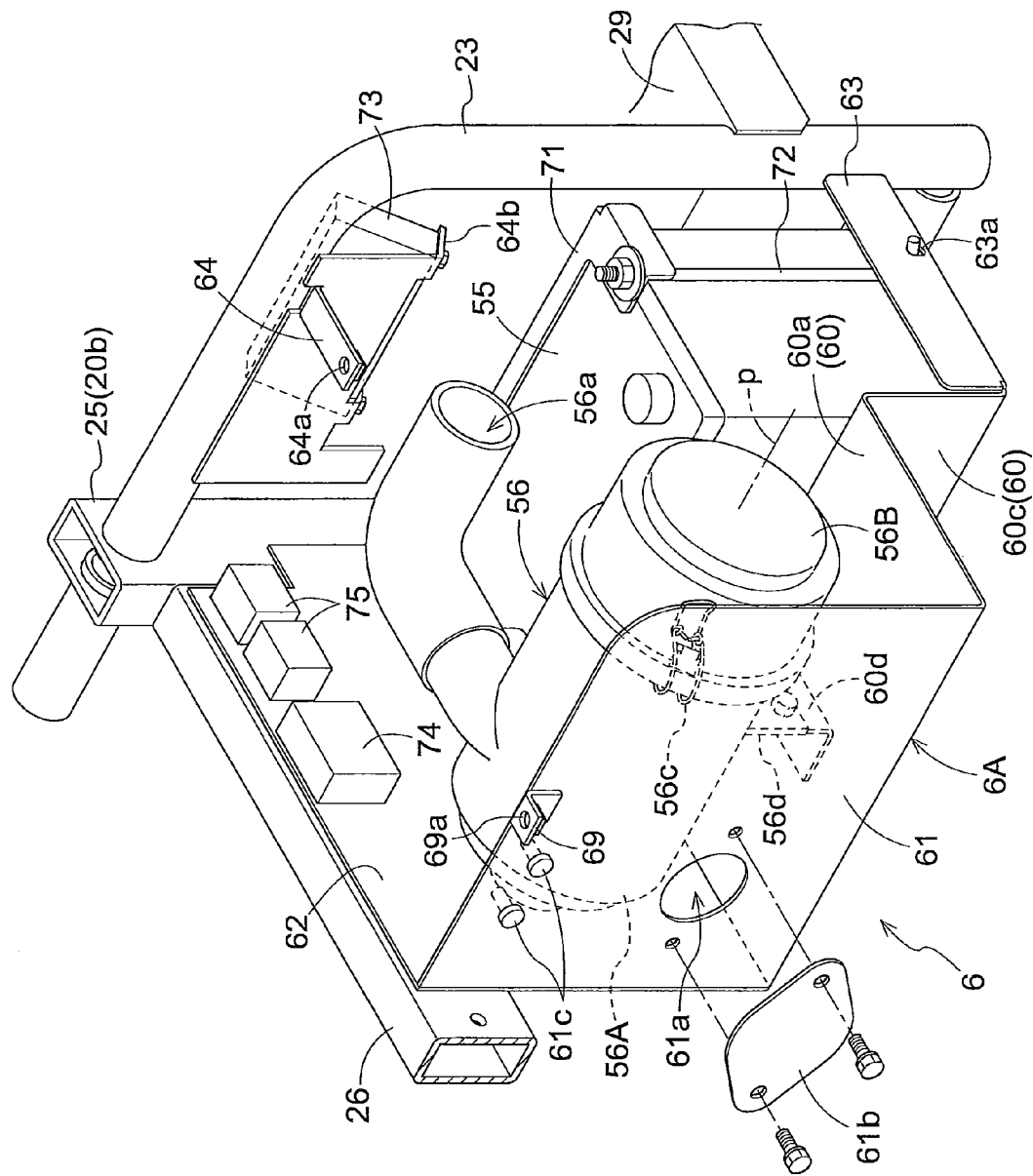
FIG. 15 is a perspective view showing the container space with a lid case portion removed.

In a lower portion of the fixed case portion 6A, as shown in FIGS. 12 and 14, the bottom plate 60 and a lower portion of the inner wall plate 62 are mounted on, welded to, and supported by the portion of the main frame front portion 20a forming the body frame 2 which portion extends rearward of the rear seat support frame 25 forming the main frame standing portion 20b. As shown in FIGS. 13 and 15, a front end portion of the standing piece 63 is welded to and supported by a lower portion of the pipe-shaped rear seat constitutive frame 23 extending laterally outward from the rear seat support frame 25.

On an upper end side of the fixed case portion 6A, as shown in FIGS. 12-15, an upper end of the inner wall plate 62 is welded to and supported by the lateral outer face of the truck box support frame 26. In addition, a front end portion of the inner wall plate 62 is welded to and supported by a lateral outer face of the rear seat support frame 25.

The lid case portion 6B is integrally made of a synthetic resin material, and includes, as shown in FIGS. 12-14: a ceiling wall 65; a front wall 66 on a front side; a lateral wall 67 on a lateral outer side; and a bent piece 68 suspended on a rear side, relative to the ceiling wall 65. The lid case portion 6B is opened in an inner side and a lower side in terms of the vehicle body.

The lid case portion 6B has bolt insertion holes 65a at two locations: one at a portion of the ceiling wall 65 closer to a front side of the vehicle body; and the other at a portion closer to a rear side of the vehicle body. As shown in FIGS. 12, 13 and 15, a portion closer to the front side of the vehicle body is fixed to a mounting piece 64 having a screw hole 64a connected to a portion of the rear seat constitutive frame 23 through a knurled bolt 70.

Likewise, a portion closer to the rear side of the vehicle body is configured to be fixed to a mounting piece 69 having a screw hole 69a provided on the bent piece 68 on the rear side, through the knurled bolt 70. A reference character "65b" shown in FIGS. 12 and 14 indicates ambient air introduction holes formed in the ceiling wall 65 of the lid case portion 6B, which is located below the rear sitting portion 14a and at the same time inward of an outer end of the rear sitting portion 14a.

In the container box 6, the battery 55 is mounted on the bottom plate lower portion 60b of the bottom plate 60 and attached thereto by a known fixing bracket 71 and check bolts 72. From among the check bolts 72, the check bolt 72 locating outward has a lower end portion engaged with a locking hole 63a formed in the standing piece 63, while the check bolt 72 locating inward has a lower end portion engaged with a locking hole (not shown) formed in the inner wall plate 62.

The air cleaner 56 includes: a cylindrical body 56A having an intake opening 56a and an air supply duct 56b; and a removable lid 56B. The lid 56B is configured to be attachable and removable through a buckle 56c, and with this mechanism, a filter element 56E becomes insertable and removable.

In order to make the insertion and removal of the filter element 56E operable from an outer lateral side of the vehicle body 1, a cylindrical axis p of the cylindrical body 56A is oriented in the vehicle transverse direction, with an opening side thereof facing outward of the vehicle body, and with the lid 56B being positioned on the outer lateral side of the cylindrical body 56A.

In order to dispose the air cleaner 56 in the above-described manner, as shown in FIGS. 12-15, the air cleaner 56 is fixed with bolts through a mounting piece 56d provided on a lower portion of the air cleaner 56, to a bracket 60d vertically arranged on the bottom plate higher portion 60a of the bottom plate 60.

Under this attachment state, the intake opening 56a of the air cleaner 56 is positioned in a space of the container box 6 above the battery 55, and sucks ambient air inside the container box 6.

The air supply duct 56b of the air cleaner 56 penetrates the inner wall plate 62 of the container box 6 and extends to a motor part 50 side, and as shown in FIG. 11, is configured to linearly supply ambient air to an intake manifold (not shown) of the engine 51.

In the container box 6, a fuse box 73 is attached to a plate member 64b integrally formed with the mounting piece 64 connected to a portion of the rear seat constitutive frame 23, and the fuse box 73 is disposed at a position closer to the intake opening 56a where ambient air is sucked up. Accordingly, even when a temperature inside the container box 6 raises due to heat release by the battery 55, ambient air with a high temperature is taken from the intake opening 56a and is sent to the engine 51. Therefore, abnormal temperature raise in the container box 6 can be prevented.

In addition, a relay box 74 and various electric components 75 are disposed in the container box 6, in addition to the fuse box 73. It should be noted that, ambient air is introduced into the container box 6 through the ambient air introduction hole 65b and a gap formed between the fixed case portion 6A and the lid case portion 6B, as shown in FIGS. 13 and 14.

As shown in FIG. 15, the rear wall plate 61 of the container box 6 has an opening 61a for leading the intake opening 56a of the air cleaner 56 to the outside of the container box 6, and a closing lid 61b for closing the opening 61a is screwed thereto.

In addition, in an upper portion of the rear wall plate 61, a pair of mounting bolts 61c,61c are attached.

Figure 19:
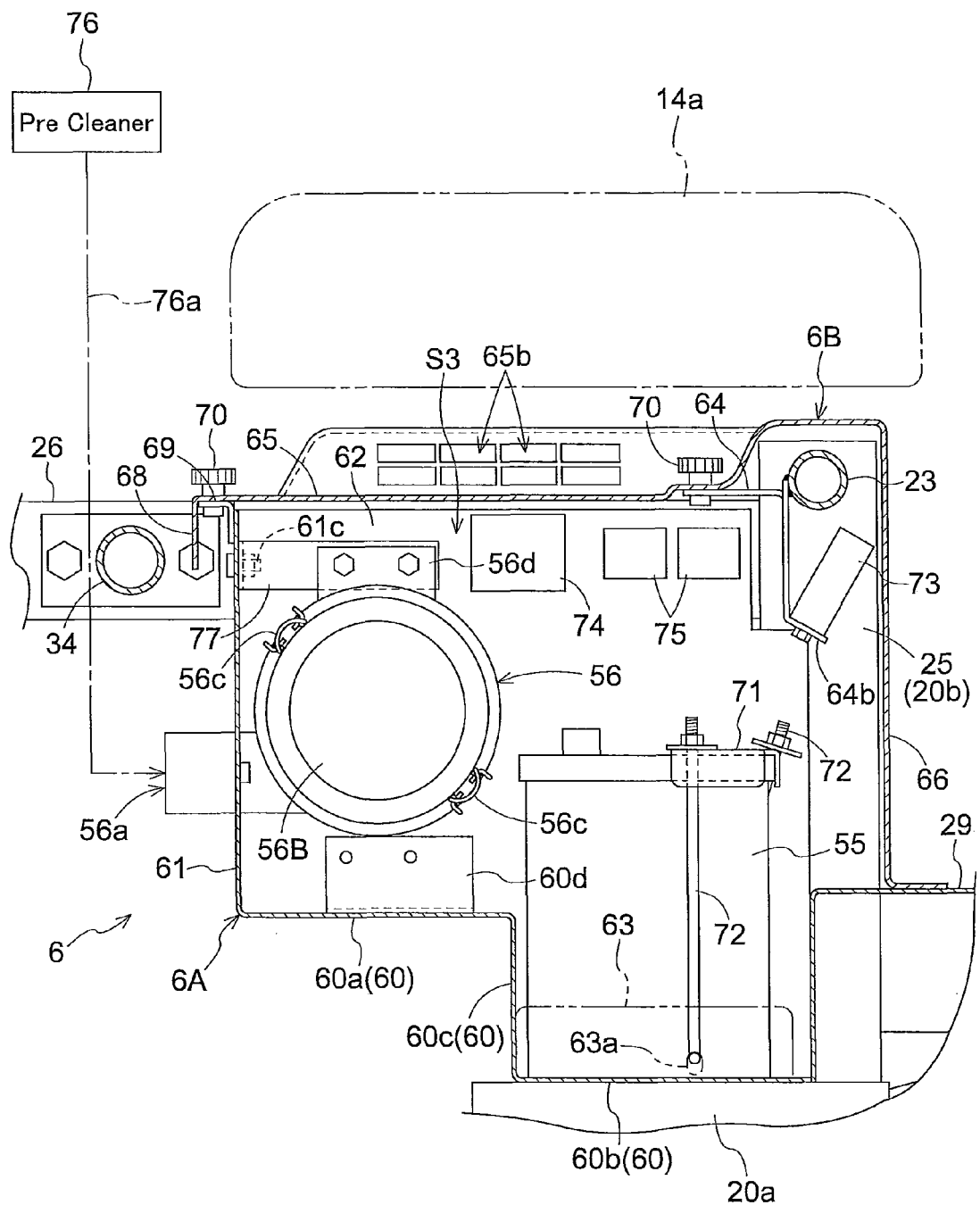
FIG. 19 is a side view showing another embodiment of an attachment state of an air cleaner.

The opening 61a and a pair of the mounting bolts 61c,61c are provided for the purpose of easily altering the specification, when the present invention is applied to a model having a pre-cleaner 76 in an upper portion of the vehicle body 1, such as an upper portion of the ROPS 30 as shown in the imaginary line in FIG. 1, and FIG. 19.

In other words, as shown in FIG. 19, it is configured that the air cleaner 56 is turned 180 degrees about the cylindrical axis p, the mounting piece 56d of the air cleaner 56 is supported by the rear wall plate 61 through an auxiliary mounting plate 77, the intake opening 56a is exposed outside through the opening 61a, and the air cleaner 56 is connected to an intake duct 76a of the pre-cleaner 76.

Figure 16:
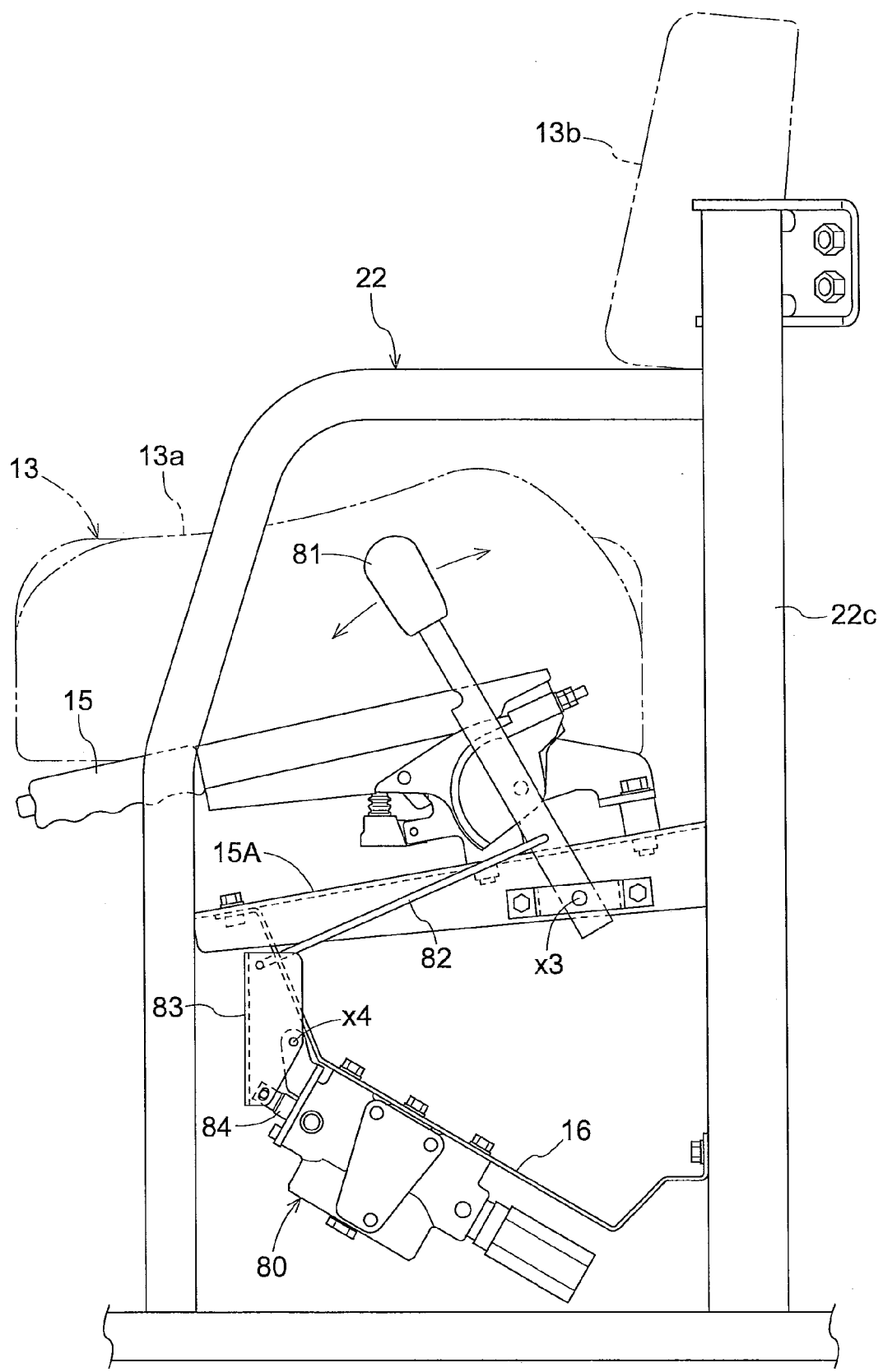
FIG. 16 is a side view showing an operation structure of an operation valve of a dump cylinder.

FIG. 16 shows an operation structure of an operation valve 80 for operating the dump cylinder 47 that swingably drives the truck box 40.

On a left side of the front driver's seat 13, a parking brake lever 15 and a support base 15A therefore are provided, and a link bracket 16 bridges the support base 15A and the support frame 22c of the body frame 2, which bracket is for attaching a link member (not shown) for transmitting an actuation of the parking brake lever 15 to a parking brake (not shown).

In this structure, the operation valve 80 for operating the dump cylinder 47 is mounted on a lower face of the link bracket 16.

The operation of the operation valve 80 is performed through: a valve operating lever 81 provided swingably about a transversal axis x3 on the support base 15A; a swing link 83 provided swingably about a transversal axis x4 on a case block 80A of the operation valve 80; and a rod 82 for connecting the swing link 83 and the valve operating lever 81. As the valve operating lever 81 is swung, the swing link 83 pushes or pulls a spool 84 of the operation valve 80, to thereby feed or discharge pressure oil to or from the dump cylinder 47.

Figure 17:
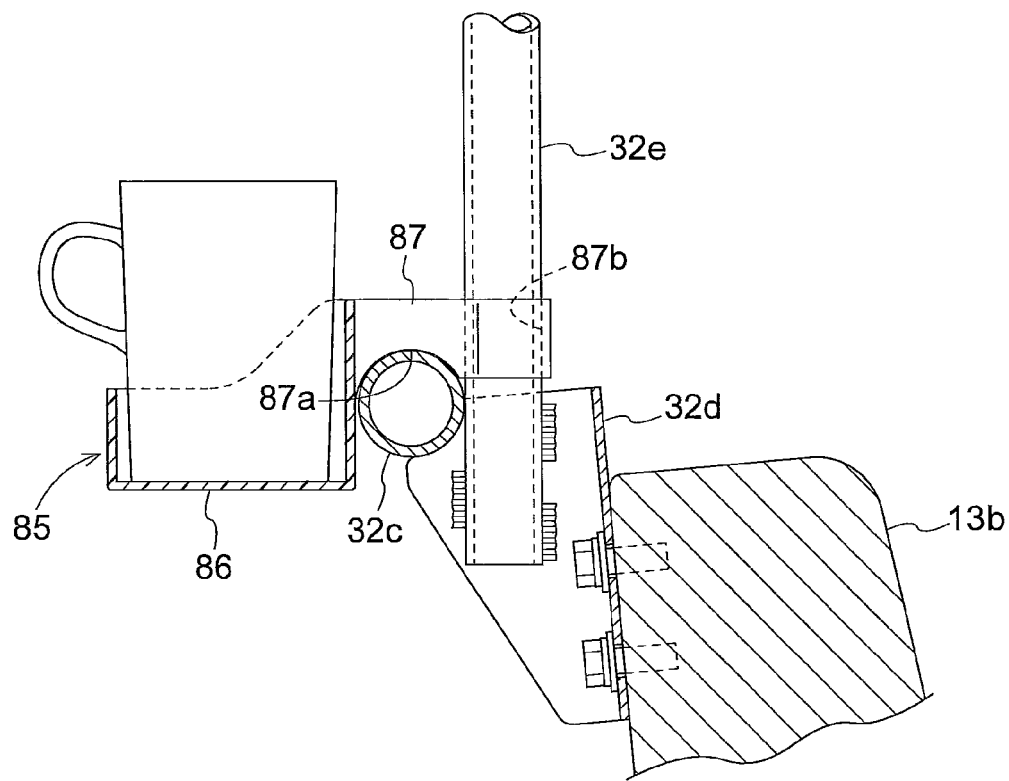
FIG. 17 is a side view showing an attachment structure for cup.
Figure 18:
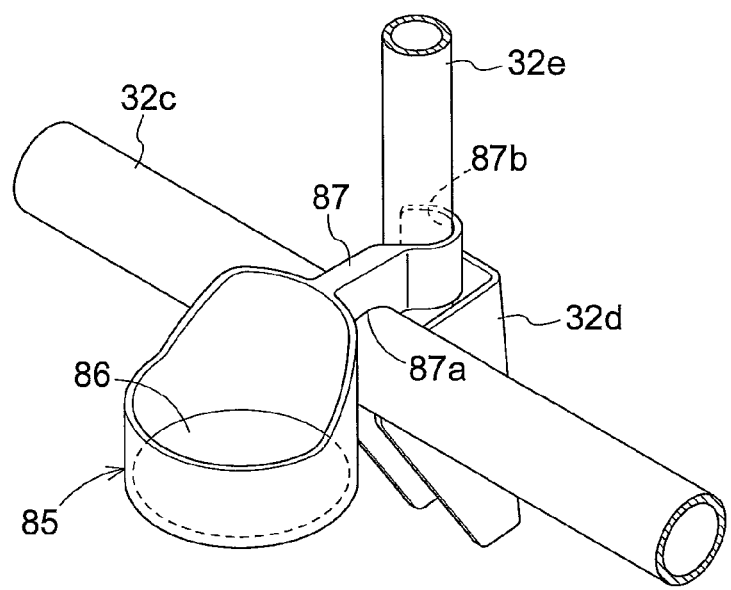
FIG. 18 is a perspective view showing the attachment structure for cup.

FIGS. 17 and 18 show an attachment structure of a cup holder 85 for the rear seat 14.

The cup holder 85 is made of a synthetic resin material and includes a cup receiving dish 86 and an attachment arm 87 integrally formed together.

The attachment arm 87 includes: a first engaging portion 87a which is opened downward and engaged from above with the reinforcing frame 32c for connecting the vertical frame portions 32b of the intermediate pole 32 of the ROPS 30 to each other; and a second engaging portion 87b which is opened laterally and elastically engaged with a vertical frame portion of the gate-shaped head rest frame 32e whose lower end portion is fixed to the mounting bracket 32d provided on the reinforcing frame 32c.

Since a weight acting on the cup holder 85 is supported by two types of engaging portions whose engagement directions in the attachment arm 87 are approximately orthogonal to each other, the cup holder 85 can be stably supported in both vertical and lateral directions.

Other Embodiment 1

In the above-described embodiment, a structure in which the partition member 90 is slid along the guide rail portion 36 was described, as the configuration of the partition member 90 switchable between the forward shifted position and the backward shifted position. The structure is not limited to this, and alternatively, the structure may be adopted in which the partition member 90 may be removably attached to the ROPS 30 in one of the forward or backward shifted position, and then the removed partition member 90 is fixed to the ROPS 30 in the other of the frontward and backward shifted position.

Other Embodiment 2

In the above-described embodiment, the work vehicle is illustrated whose rear portion of the vehicle body 1 has the truck box 40 which can perform dumping. Alternatively, the present invention is applicable to a work vehicle which cannot perform dumping (not shown), in which the truck box 40 is fixed to the rear portion of the vehicle body 1.

Other Embodiment 3

In the above-described embodiment, a structure is illustrated in which the length of the truck box 40 is changeable and the mode is switchable between the single row seat mode and the two-row seat mode. The present invention is not limited to this structure, and alternatively, the structure may be configured in such a manner that the truck box 40 is not present at all in the two-row seat mode, and a space corresponding to the truck box 40 is formed rearward of the front driver's seat 13 in the single row seat mode.

Other Embodiment 4

In the above-described embodiment, by removing the lid case portion 6B from the fixed case portion 6A, the lateral side of the container box 6 is exposed. The structure is not limited to this and alternatively, the lid case portion 6B may be attached swingably about a vertical axis or a horizontal axis to the fixed case portion 6A, so as to open and close the container box 6. Accordingly, the above-describe removable type and opening-closing type are collectively referred to as "opening-closing lid".

In the above-described embodiment, the container space for both the battery 55 and the air cleaner 56, i.e., the container box 6, is disposed on one lateral side in the vehicle body direction. Alternatively, a battery container space (box) for the battery 55 may be provided on one lateral side in the vehicle body direction, and an air cleaner container space (box) for the air cleaner 56 may be provided on the other lateral side.

The work vehicle of the present invention is not limited to a truck type vehicle, and the present invention is applicable to any vehicle with seats, such as tractor.

What is claimed is:

1. A work vehicle comprising:
    a pair of steerable right and left front wheels provided in a front portion of a vehicle body;
    a pair of non-steerable right and left rear wheels provided in a rear portion of the vehicle body;
    a seat disposed between the front wheels and the rear wheels; an engine disposed between the right and left rear wheels rearward of the seat;
    a battery disposed in a container space positioned downward of the seat disposed frontward of the rear wheels;
    an air cleaner which is disposed in the container space and arranged proximally to the battery in a vehicle longitudinal direction, the air cleaner having a filter element disposed in the air cleaner so that the filter element is insertable and removable in a vehicle transverse direction, with a position of the air cleaner being set so that the filter element is accessible from outside the vehicle body; and
    a lid unit configured to cover the air cleaner and the battery from outside in the vehicle transverse direction,
    wherein the container space is opened outward in the vehicle transverse direction when the lid unit is moved to an opening state, and the container space is closed when the lid unit is moved to a closing state at a position outward of an opened portion of the container space.

2. The work vehicle according to claim 1, wherein the lid unit comprises a single lid configured to cover both the air cleaner and the battery from outside on one side in the vehicle transverse direction.

3. The work vehicle according to claim 1, wherein
    the engine is disposed below a rear frame positioned upward and rearward of a driver floor in the front portion of the vehicle body,
    the driver floor is supported by a front frame disposed frontward of the rear frame, and
    each of the battery and the air cleaner is disposed on an outer side of at least one of the front frame and the rear frame in the vehicle transverse direction.

4. The work vehicle according to claim 1, wherein
    a bottom plate unit defining a lower side of the container space comprises a first sub bottom plate positioned at a higher height level and a second sub bottom plate positioned at a lower height level, the sub bottom plates being arranged in the vehicle longitudinal direction,
    the air cleaner is mounted on the first sub bottom plate,
    the battery is mounted on the second sub bottom plate, and
    an intake opening of the air cleaner is directed to an upper side of the battery.

5. The work vehicle according to claim 4, wherein
a side plate unit defining lateral sides of the container space comprises: a rear wall plate erecting from a rear end portion of the first sub bottom plate; and an inner wall plate erecting from an inner end portion of the first sub bottom plate in the vehicle transverse direction,
the bottom plate unit and the side plate unit form a fixed case portion fixed to and supported by the vehicle body, and
the fixed case portion together with the opening-closing lid forms a container box that defines the container space.

6. The work vehicle according to claim 1, wherein
a fuse box is disposed frontward of an intake opening of the air cleaner.

7. A work vehicle comprising:
a pair of steerable right and left front wheels provided in a front portion of a vehicle body;
a pair of non-steerable right and left rear wheels provided in a rear portion of the vehicle body;
a seat disposed between the front wheels and the rear wheels;
an engine disposed between the right and left rear wheels rearward of the seat;
a battery disposed in a container space positioned downward of the seat disposed frontward of the rear wheels;
an air cleaner which is disposed in the container space and arranged proximally to the battery in a vehicle longitudinal direction, the air cleaner having a filter element disposed in the air cleaner so that the filter element is insertable and removable in a vehicle transverse direction, with a position of the air cleaner being set so that the filter element is accessible from outside the vehicle body; and
A lid unit configured to cover the air cleaner and the battery from outside in the vehicle transverse direction,
wherein the battery is disposed at a lower level than the air cleaner, and
an intake opening of the air cleaner is directed to an upper side of the battery.

8. The work vehicle according to claim 7, wherein
a bottom plate unit defining a lower side of the container space comprises a first sub-bottom plate positioned at a higher height level and a second sub-bottom plate positioned at a lower height level, the sub-bottom plates being arranged in the vehicle longitudinal direction,
the air cleaner is mounted on the first sub-bottom plate, and
the battery is mounted on the second sub-bottom plate.

9. A work vehicle comprising:
a pair of steerable right and left front wheels provided in a front portion of a vehicle body;
a pair of non-steerable right and left rear wheels provided in a rear portion of the vehicle body;
a pair of right and left main frames extending in a vehicle longitudinal direction;
a seat disposed between the front wheels and the rear wheels;
an engine disposed between the right and left rear wheels rearward of the seat;
a battery disposed in a container space positioned downward of the seat disposed frontward of the rear wheels;
an air cleaner which is disposed in the container space and arranged proximally to the battery in the vehicle longitudinal direction, the air cleaner having a filter element disposed in the air cleaner so that the filter element is insertable and removable in a vehicle transverse direction, with a position of the air cleaner being set so that the filter element is accessible from outside the vehicle body; and
a container box having an lid unit configured to cover the air cleaner and the battery from outside in the vehicle transverse direction, the container box defining the container space,
wherein the container box is disposed on a lateral outer side of one of the right and left main frames in the vehicle transverse direction.

10. The work vehicle according to claim 9, further comprising:
a transmission case,
wherein the engine and the transmission case are disposed between the right and left main frames in the vehicle transverse direction.

* * * * *